(12) United States Patent
Nishio et al.

(10) Patent No.: US 10,931,915 B2
(45) Date of Patent: Feb. 23, 2021

(54) TRANSMISSION DEVICE, RECEPTION DEVICE, CABLE, TRANSMISSION METHOD, AND RECEPTION METHOD

(71) Applicant: Panasonic Intellectual Property Management Co., Ltd., Osaka (JP)

(72) Inventors: Toshiroh Nishio, Osaka (JP); Naoshi Usuki, Kyoto (JP); Satoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 16/303,167

(22) PCT Filed: May 30, 2017

(86) PCT No.: PCT/JP2017/020013
§ 371 (c)(1),
(2) Date: Nov. 20, 2018

(87) PCT Pub. No.: WO2017/209097
PCT Pub. Date: Dec. 7, 2017

(65) Prior Publication Data
US 2019/0335139 A1 Oct. 31, 2019

(30) Foreign Application Priority Data
Jun. 1, 2016 (JP) .............................. JP2016-110276

(51) Int. Cl.
*H04N 7/10* (2006.01)
*H04N 5/63* (2006.01)
(Continued)

(52) U.S. Cl.
CPC ............... *H04N 7/104* (2013.01); *H04N 5/63* (2013.01); *H04N 7/005* (2013.01); *H04N 7/0806* (2013.01)

(58) Field of Classification Search
CPC .................................................. H04L 25/03942
See application file for complete search history.

(56) References Cited

U.S. PATENT DOCUMENTS 7,024,616 B2 4/2006 Ohira et al.
8,340,529 B2 * 12/2012 Shastri .................. G09G 5/006
398/141

(Continued)

FOREIGN PATENT DOCUMENTS

CN 102804765 A 11/2012
EP 2897136 A1 7/2015
(Continued)

OTHER PUBLICATIONS

The Supplementary Partial European Search Report dated Feb. 15, 2019 for the related European Patent Application No. 17806651.0.
(Continued)

*Primary Examiner* — Henry Tsai
*Assistant Examiner* — Juanita Borromeo
(74) *Attorney, Agent, or Firm* — McDermott Will and Emery LLP

(57) ABSTRACT

A transmission apparatus includes a video obtainer configured to obtain a video signal, a first converter configured to convert the video signal into an electrical signal complying with a high definition multimedia interface (HDMI (registered trademark)) standard, a second converter configured to convert the video signal into an optical signal, and a signal processor configured to perform at least one of the conversion using the first converter and the conversion using the second converter with respect to the obtained video signal.

23 Claims, 10 Drawing Sheets

(51) Int. Cl.
*H04N 7/00* (2011.01)
*H04N 7/08* (2006.01)

(56) References Cited

U.S. PATENT DOCUMENTS

| | | | |
|---|---|---|---|
| 8,457,153 B2* | 6/2013 | Nguyen | H04B 10/40 |
| | | | 370/463 |
| 8,843,679 B2 | 9/2014 | Toba et al. | |
| 2006/0067690 A1 | 3/2006 | Tatum et al. | |
| 2010/0271486 A1 | 10/2010 | Bohm | |
| 2010/0316388 A1 | 12/2010 | Shastri et al. | |
| 2012/0002562 A1 | 1/2012 | Kawade | |
| 2015/0010311 A1 | 1/2015 | Parekh et al. | |

FOREIGN PATENT DOCUMENTS

| | | |
|---|---|---|
| JP | 2005-124194 | 5/2005 |
| JP | 2009-232432 A | 10/2009 |
| JP | 2012-227571 | 11/2012 |
| JP | 2014-064369 | 4/2014 |
| JP | 2015-053265 | 3/2015 |

OTHER PUBLICATIONS

The Extended European Search Report dated May 27, 2019 for the related European Patent Application No. 17806651.0.
English Translation of Chinese Search Report dated Jun. 29, 2020 for the related Chinese Patent Application No. 201780032802.2.
International Search Report of PCT application No. PCT/JP2017/020013 dated Aug. 22, 2017.
Zenji Nishikawa, "Large Screen Enthusiast—Zenji Nishikawa, 216th, Can 8K video be sent through one cable? The latest trends surrounding 8K transmission", Impress Watch, Impress Corp. [online], Jan. 18, 2016 (Jan. 18, 2016) [retrieval date Aug. 4, 2017 (Aug. 4, 2017), Internet <URL:http://av.watch.impress.co.jp/docs/series/dg/739175.html>, pp. 1 to 6.
High-Definition Multimedia Interface (HDMI; a registered trademark) Specification Version 1.3a, Nov. 10, 2006, [search on Dec. 1, 2015], Internet <URL:tthp://www.hdmi.org/manufacturer/specification.aspx>.

* cited by examiner

TRANSMISSION DEVICE, RECEPTION DEVICE, CABLE, TRANSMISSION METHOD, AND RECEPTION METHOD

CROSS-REFERENCE TO RELATED APPLICATIONS

This application is a U.S. national stage application of the PCT International Application No. PCT/JP2017/020013 filed on May 30, 2017, which claims the benefit of foreign priority of Japanese patent application No. 2016-110276 filed on Jun. 1, 2016, the contents all of which are incorporated herein by reference.

TECHNICAL FIELD

The present disclosure relates to a transmission apparatus that transmits electrical and optical signals complying with a high definition multimedia interface (HDMI (registered trademark)) standard, a reception apparatus that receives these signals, a cable used for transmission/reception of the signals, a transmission method, and a reception method.

BACKGROUND ART

A signal transmission scheme is defined in an HDMI (registered trademark) standard (see, for example, NPL1). This transmission scheme is widely used for transmission of video signals and audio signals between audio visual (AV) devices.

With advances in high definition television (to be also referred to as "TV" hereinafter) technology, video signals and audio signals increase in information amount. For this reason, physical limitations sometimes make it difficult to transmit a video signal represented by an electrical signal.

CITATION LIST

Non-Patent Literature

NPL1: HDMI (registered trademark) specification Ver. 1.3a [search on Dec. 1, 2015], Internet <URL: http://www.hdmi.org/manufacturer/specification.aspx>

SUMMARY

The present disclosure provides a transmission apparatus that can transmit a video signal with a relatively large information amount.

A transmission apparatus according to the present disclosure includes a video obtainer configured to obtain a video signal, a first converter configured to convert the video signal into an electrical signal complying with a high definition multimedia interface (HDMI (registered trademark)) standard, a second converter configured to convert the video signal into an optical signal, and a signal processor configured to perform at least one of the conversion using the first converter and the conversion using the second converter with respect to the obtained video signal.

According to the present disclosure, it is possible to transmit a video signal with a relatively large information amount.

DESCRIPTION OF EMBODIMENTS

Figure 1:
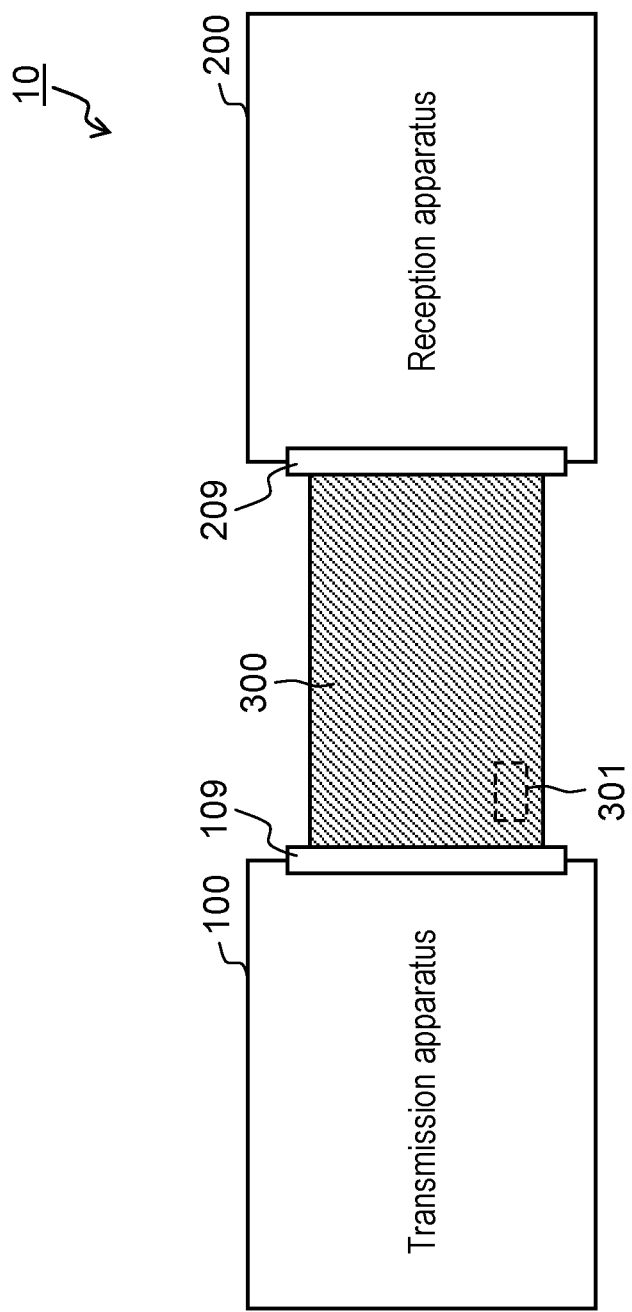
FIG. 1 is a view schematically showing an outline configuration of a transmission-and-reception system according to a first exemplary embodiment.

Exemplary embodiments will be described in detail below with appropriate reference to the drawings. It is noted that a more detailed description than necessary may be omitted. For example, the detailed description of already well-known matters and the overlap description of substantially same configurations may be omitted. This is to avoid an unnecessarily redundant description below and to facilitate understanding of a person skilled in the art.

Note that the attached drawings and the following description are provided for those skilled in the art to fully understand the present disclosure, and are not intended to limit the subject matter as described in the appended claims.

The respective drawings are only schematic drawings but not precise ones. In addition, the same reference numerals denote substantially identical constituent elements, and a repetitive description may be omitted or simplified.

First Exemplary Embodiment

[1-1. Outline Configuration of Transmission-and-Reception System]

Transmission-and-reception system 10 according to a first exemplary embodiment will be described below with reference to the accompanying drawings. An outline configuration of the transmission-and-reception system 10 according to the first exemplary embodiment will be described first.

FIG. 1 is a view schematically showing the outline configuration of transmission-and-reception system 10 according to the first exemplary embodiment.

As shown in FIG. 1, transmission-and-reception system 10 includes transmission apparatus 100, reception apparatus 200, and cable 300.

Transmission apparatus 100 is an apparatus that processes a video baseband signal and transmits the processed signal to reception apparatus 200 provided outside transmission apparatus 100. Transmission apparatus 100 operates as a source device complying with an HDMI (registered trademark) standard and includes composite connector 109. Transmission apparatus 100 can convert a video baseband signal into an electrical signal complying with the HDMI (registered trademark) standard and transmit the electrical signal. In addition, although described in detail later, transmission apparatus 100 can also convert the video baseband signal into an optical signal and transmit the optical signal. Note that the optical signal means a signal generated by modulating light in accordance with an electrical signal. In the following exemplary embodiments, any signal that is not specified as an optical signal is basically the electrical signal.

Transmission apparatus 100 is, for example, a Blue-ray (registered trademark) player, a hard disk drive (HDD) recorder, a set-top box, or a smartphone. Transmission apparatus 100 may be implemented as an integrated circuit. In this case, transmission apparatus 100 may not include composite connector 109.

Reception apparatus 200 is an apparatus that receives at least one of an electrical signal and an optical signal from transmission apparatus 100 and outputs (displays) a video based on the received signal. Reception apparatus 200 operates as a sink device complying with the HDMI (registered trademark) standard and includes composite connector 209. Reception apparatus 200 is, in particular, a television set, a Blue-ray (registered trademark) player, an HDD recorder, a personal computer, a smartphone, a tablet terminal, or the like.

Cable 300 electrically or optically connects transmission apparatus 100 to reception apparatus 200. In other words, transmission apparatus 100 and reception apparatus 200 are mutually connected via cable 300. A connector structure (not shown) is attached to one end of cable 300 and detachably connected to composite connector 109 of transmission apparatus 100. A connector structure (not shown) is attached to the other end of cable 300 and detachably connected to composite connector 209 of reception apparatus 200.

Cable 300 may include storage 301 storing cable information indicating a maximum transmission rate of electrical signals via cable 300. Note that a transmission rate is an amount of information to be transmitted per unit time (for example, one sec), and a maximum transmission rate is a maximum amount of information that can be transmitted per unit time (for example, one sec). In addition, cable 300 may include a terminal (not shown) for outputting the cable information. In this case, transmission apparatus 100 can obtain the cable information from storage 301. Storage 301 is, in particular, a semiconductor memory, a semiconductor chip, or the like, but may be implemented by a resistor or the like. In addition, storage 301 may also store a maximum transmission rate of optical signals. Note that storage 301 and the terminal for outputting the cable information are not essential constituent elements of the present disclosure.

[1-2. Configuration of Transmission Apparatus]

A configuration of transmission apparatus 100 will be described next.

Figure 2:
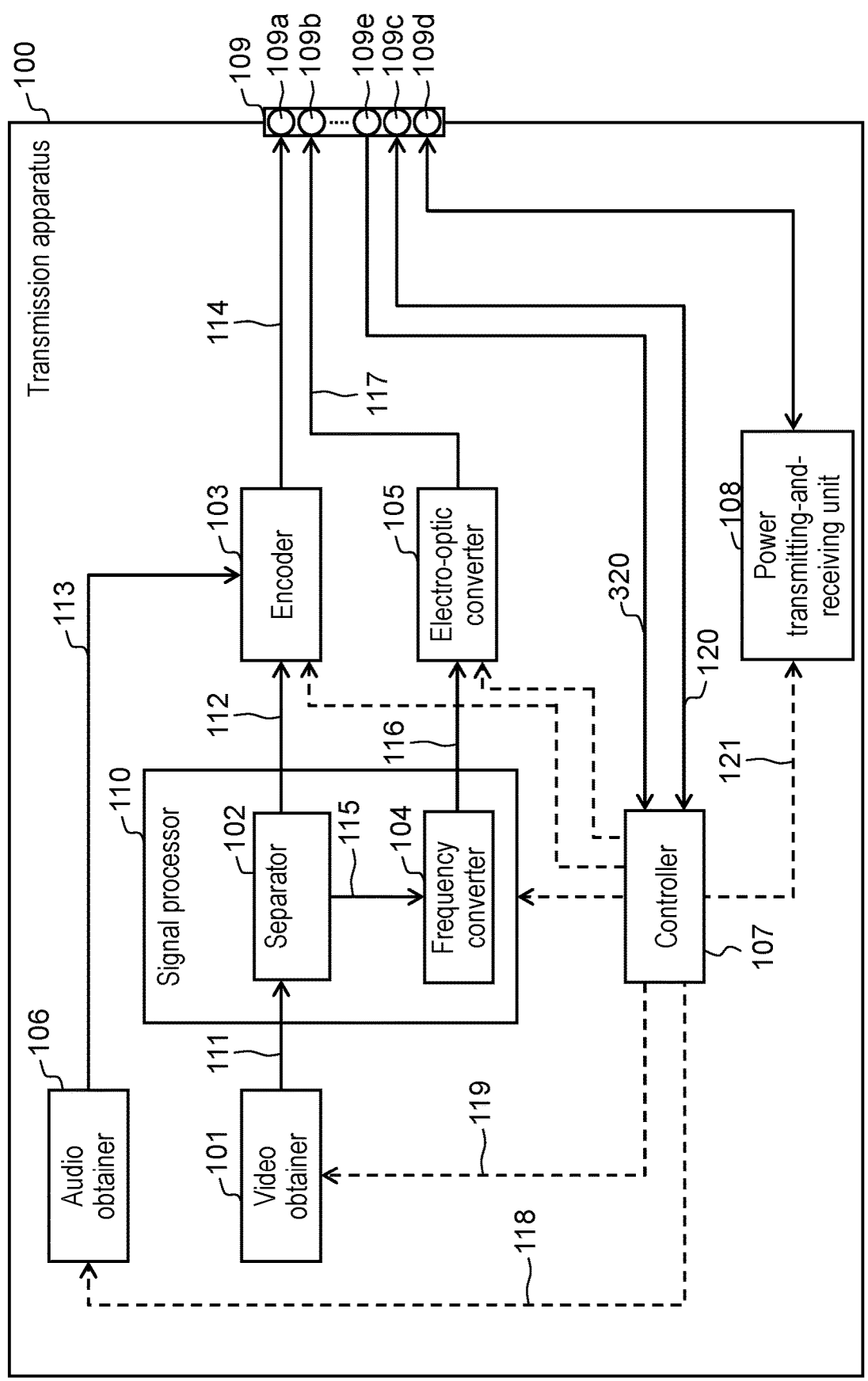
FIG. 2 is a block diagram schematically showing an example of a configuration of a transmission apparatus according to the first exemplary embodiment.

FIG. 2 is a block diagram schematically showing an example of the configuration of transmission apparatus 100 according to the first exemplary embodiment.

As shown in FIG. 2, transmission apparatus 100 includes video obtainer 101, signal processor 110, encoder 103, electro-optic converter 105, audio obtainer 106, controller 107, power transmitting-and-receiving unit 108, and composite connector 109. Signal processor 110 includes separator 102 and frequency converter 104.

Transmission apparatus 100 can convert video baseband signal 111 for forming a plurality of images (moving image) into an electrical signal complying with the HDMI (registered trademark) standard. In addition, transmission apparatus 100 can convert video baseband signal 111 into an optical signal. Transmission apparatus 100 can also convert part of video baseband signal 111 into an electrical signal and convert the other part of video baseband signal 111 into an optical signal.

Video obtainer 101 obtains video baseband signal 111 as an uncompressed (not compressed) signal and outputs the signal to separator 102 of signal processor 110. Video obtainer 101 may obtain video baseband signal 111 from, for example, a device (not shown) provided outside transmission apparatus 100. Alternatively, when transmission apparatus 100 incorporates a device (not shown) for playing back video baseband signal 111, video obtainer 101 may obtain video baseband signal 111 from the device. In addition, when transmission apparatus 100 includes a video signal generator (not shown) for generating video baseband signal 111 from a compressed video signal, video obtainer 101 may obtain video baseband signal 111 generated by the video signal generator.

Video obtainer 101 obtains video baseband signal 111 via, for example, a terrestrial or satellite television broadcast wave, a recording medium such as a Blue-ray (registered trademark) disk, a cable for television broadcast signal transmission, or the Internet.

Audio obtainer 106 obtains audio baseband signal 113, which is an uncompressed (not compressed) signal, and outputs the signal to the encoder 103. Audio obtainer 106 may obtain audio baseband signal 113 from, for example, a device (not shown) provided outside transmission apparatus 100. Alternatively, when transmission apparatus 100 incorporates a device (not shown) for playing back audio baseband signal 113, audio obtainer 106 may obtain audio baseband signal 113 from the device. In addition, when transmission apparatus 100 includes an audio signal generator (not shown) for generating audio baseband signal 113 from a compressed audio signal, audio obtainer 106 may obtain audio baseband signal 113 generated by the audio signal generator.

Audio obtainer 106 obtains audio baseband signal 113 via, for example, a terrestrial or satellite television broadcast wave, a recording medium such as a Blue-ray (registered trademark) disk, a cable for television broadcast signal transmission, or the Internet.

Note that video baseband signal 111 obtained by video obtainer 101 and audio baseband signal 113 obtained by audio obtainer 106 are usually synchronous signals that constitute one moving image content. Video obtainer 101 and audio obtainer 106 therefore obtain video baseband signal 111 and audio baseband signal 113 concurrently in the same period. Likewise, audio obtainer 106 and signal processor 110 respectively output audio baseband signal 113 and low-band video signal 112 to encoder 103, for example, concurrently in the same period.

Separator 102 of signal processor 110 directly outputs entire video baseband signal 111 obtained from video obtainer 101 to encoder 103 to cause encoder 103 to convert obtained video baseband signal 111. In addition, separator 102 of signal processor 110 directly outputs entire video baseband signal 111 obtained from video obtainer 101 to electro-optic converter 105 via frequency converter 104 to cause electro-optic converter 105 to convert obtained video baseband signal 111.

In this manner, signal processor 110 performs at least one of conversion using encoder 103 and conversion using electro-optic converter 105 with respect to video baseband signal 111 obtained by video obtainer 101.

Signal processor 110 can also perform video separating processing for video baseband signal 111 obtained by video obtainer 101. In this video separating processing, signal processor 110 separates video baseband signal 111 obtained from video obtainer 101 into low-band video signal 112 and second high-band video signal 116 and outputs the signals. Signal processor 110 then outputs low-band video signal 112 to encoder 103 to cause encoder 103 to convert low-band video signal 112 into electrical signal 114 complying with the HDMI (registered trademark) standard. Signal processor 110 also outputs second high-band video signal 116 to electro-optic converter 105 to cause electro-optic converter 105 to convert second high-band video signal 116 into optical signal 117.

The above video separating processing is, in particular, performed by separator 102 and frequency converter 104, which signal processor 110 includes. Video separating processing according to this exemplary embodiment will be described below with reference to FIG. 3.

Figure 3:
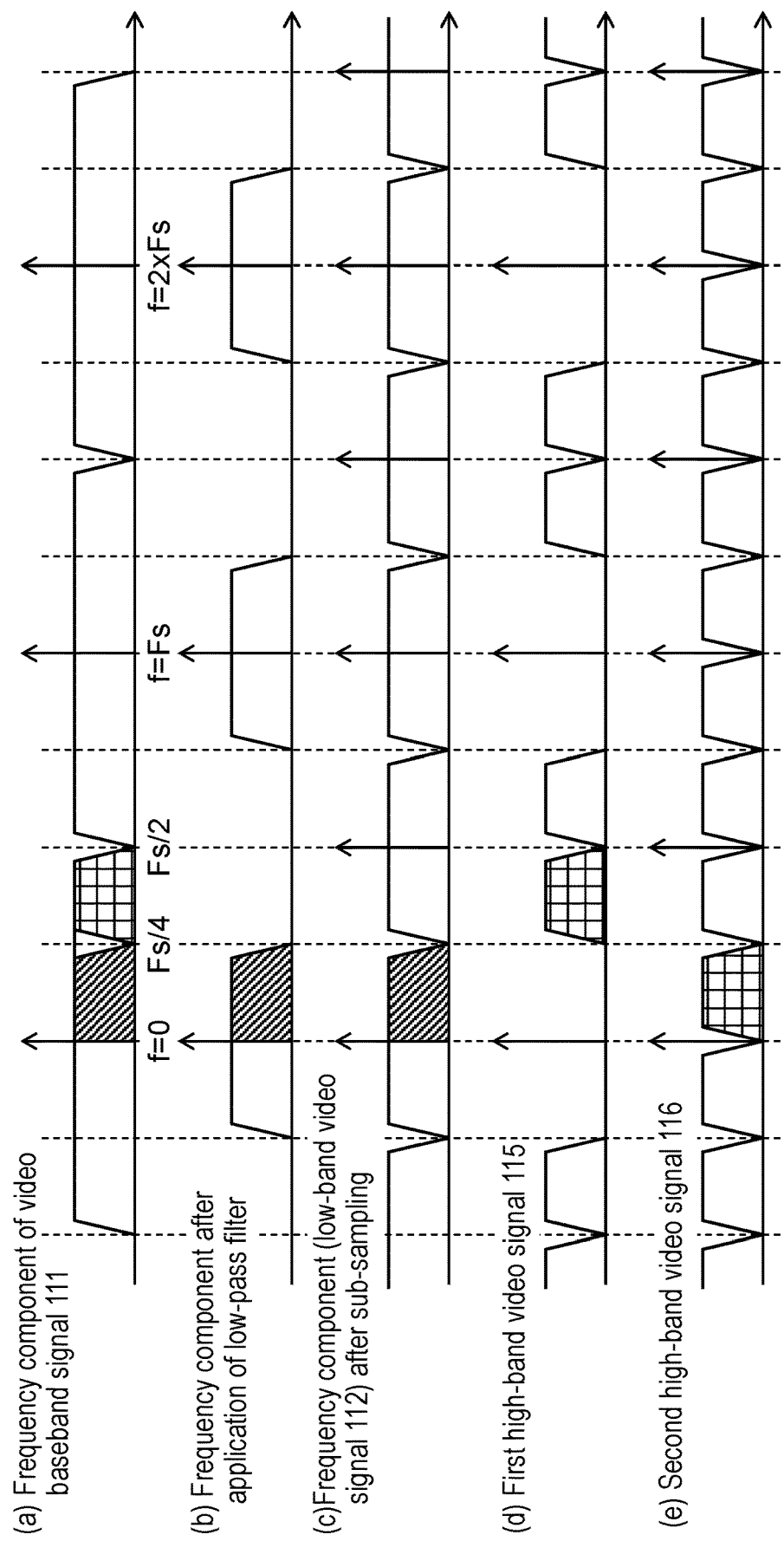
FIG. 3 is a chart for explaining operations of a separator and a frequency converter in video separating processing according to the first exemplary embodiment.

FIG. 3 is a chart for explaining operations of separator 102 and frequency converter 104 in video separating processing according to the first exemplary embodiment. Note that when it is necessary to perform video separating processing for video baseband signal 111 in a frequency domain, transformation processing such as discrete cosine transform (DCT) and inverse DCT is performed, as needed. Note that because the DCT and the inverse DCT are generally known signal transformation techniques, a description of the techniques will be omitted.

Separator 102 separates video baseband signal 111 for forming an image into and low-band video signal 112 and first high-band video signal 115. Low-band video signal 112 is a signal for forming a low-frequency component of an image, whereas first high-band video signal 115 is a signal for forming a high-frequency component of the image. Note that in the following description, a frequency component means a spatial frequency component of an image unless otherwise specified.

When Fs represents a sampling frequency that an original video signal of video baseband signal 111 has, separator 102 firstly filters video baseband signal 111 through a low-pass filter circuit that only passes frequency components in a band from 0 to Fs/4 inclusive. This will obtain a signal having a frequency component (in the band from 0 to Fs/4 inclusive) as indicated by part (b) of FIG. 3 from video baseband signal 111 (in a band from 0 to Fs/2 inclusive) indicated by part (a) of FIG. 3.

Separator 102 then samples (downsamples) the signal having the frequency component indicated by part (b) of FIG. 3 at a sampling frequency Fs/2. The signal obtained in this manner is low-band video signal 112. A frequency component (in the band from 0 to Fs/4 inclusive) of low-band video signal 112 is indicated by part (c) of FIG. 3. Separator 102 outputs low-band video signal 112 to encoder 103. Encoder 103 then converts low-band video signal 112 into electrical signal 114 complying with the HDMI (registered trademark) standard. Note that the above processing by separator 102 is performed, for example, in each of horizontal and vertical directions of an image.

Separator 102 also filters video baseband signal 111 (having a frequency component in the band from 0 to Fs/2 inclusive) through a bandpass filter circuit that passes frequency components in a band from Fs/4 to Fs/2 inclusive. Separator 102 outputs the signal (having a frequency component in the band from Fs/4 to Fs/2 inclusive) obtained from this bandpass filter circuit as first high-band video signal 115 to frequency converter 104. The frequency component of first high-band video signal 115 is indicated by part (d) of FIG. 3.

Frequency converter 104 converts a sampling frequency of first high-band video signal 115 from Fs to Fs/2. That is, frequency converter 104 sub-samples (downsamples) first high-band video signal 115 at sampling frequency Fs/2. The signal obtained by sub-sampling first high-band video signal 115 in this manner is second high-band video signal 116. A frequency component of second high-band video signal 116 is indicated by part (e) of FIG. 3.

When first high-band video signal 115 is sub-sampled at sampling frequency Fs/2, the frequency component of second high-band video signal 116 is equivalent to a form in which the frequency component of first high-band video signal 115 is folded back to a low band. Frequency converter 104 outputs second high-band video signal 116 to electro-optic converter 105. Electro-optic converter 105 converts second high-band video signal 116 into optical signal 117. Note that sub-sampling processing performed by frequency converter 104 is not essential process to the present disclosure.

Encoder 103 converts (encodes) a signal input to encoder 103 into electrical signal 114 (HDMI (registered trademark) signal) complying with the HDMI (registered trademark) standard. More specifically, encoder 103 generates electrical signal 114 containing low-band video signal 112 and audio baseband signal 113 corresponding to (synchronized with) the video signal. Electrical signal 114 is output from terminal 109a of composite connector 109 via a transmission path such as a wiring formed so as to contain a metal. Terminal 109a is an output terminal for outputting electrical signal 114 to an external apparatus such as reception apparatus 200, and is formed so as to contain a metal.

Electro-optic converter 105 converts video baseband signal 111 into optical signal 117. More specifically, electro-optic converter 105 converts second high-band video signal 116 into optical signal 117. Electro-optic converter 105 converts second high-band video signal 116 into optical signal 117 by using, for example, a light-emitting diode. Optical signal 117 is output from terminal 109b for optical output, which composite connector 109 has, via a transmission path such as an optical fiber for transmission of optical signals. Note that when video separating processing is performed for video baseband signal 111, electrical signal 114 and optical signal 117 may be concurrently output.

Controller 107 receives serial control signal 120 transmitted from reception apparatus 200. Controller 107 then outputs audio control signal 118 to audio obtainer 106, and video control signal 119 to video obtainer 101 on the basis of received serial control signal 120. Serial control signal 120 is received via terminal 109c of composite connector 109. Controller 107 may output control signals to signal processor 110, encoder 103, and electro-optic converter 105 on the basis of received serial control signal 120. In addition, controller 107 outputs power control signal 121 for issuing an instruction to supply power (to be referred to as "power transmission" hereinafter) or an instruction to receive power (to be referred to as "power reception" hereinafter) to power transmitting-and-receiving unit 108 on the basis of received serial control signal 120. Referring to FIG. 2, broken line arrows indicate control signals output from controller 107.

Serial control signal 120 contains, for example, receiver information of reception apparatus 200. The receiver information indicates, for example, a maximum transmission rate of electrical signals 114 at reception apparatus 200, reception apparatus 200 can receive electrical signals 114 transmitted at a transmission rate not more than the maximum transmission rate indicated by the receiver information.

Note that controller 107 may transmit a control signal to reception apparatus 200 via terminal 109c.

Power transmitting-and-receiving unit 108 performs power transmission to reception apparatus 200 or power reception from reception apparatus 200 on the basis of power control signal 121. Power transmission to reception apparatus 200 or power reception from reception apparatus 200 is performed via terminal 109d of composite connector 109.

Composite connector 109 is a connector structure obtained by combining terminal 109a for outputting electrical signal 114, terminal 109b for outputting optical signal 117, and other terminals. Cable 300 is connected to composite connector 109. A portion of composite connector 109 which is associated with electrical signal 114 satisfies HDMI (registered trademark) standard specifications.

Composite connector 109 includes terminal 109e for obtaining cable information 320 from storage 301 included in cable 300. When cable 300 is connected to composite connector 109, a terminal (not shown) that cable 300 has and serves to output cable information 320 is electrically connected to terminal 109e. Controller 107 can therefore obtain cable information 320 via terminal 109e. According to the configuration example shown in FIG. 2, controller 107 obtains cable information 320. However, signal processor 110 may obtain this information. Note that composite connector 109 incorporates terminals 109a to 109e described above in one connector housing.

The number and the like of terminals included in the composite connector 109 described above are merely examples, and the present disclosure is not limited to the above configuration. For example, composite connector 109 may include a plurality of terminals 109b for outputting optical signal 117. In addition, in place of composite connector 109, transmission apparatus 100 may separately include a connector for outputting electrical signal 114 and a connector for outputting optical signal 117. In this configuration, the connector for outputting electrical signal 114 preferably has a structure complying with the HDMI (registered trademark) standard.

More specifically, each constituent element of transmission apparatus 100 described above is implemented by a processor, a microcomputer, a semiconductor integrated circuit, a dedicated circuit, or the like. For example, each constituent element may be implemented as an independent processor or part of functions of one processor.

For example, video obtainer 101, audio obtainer 106, signal processor 110, encoder 103, and electro-optic converter 105 may be implemented by a processor, whereas controller 107 and power transmitting-and-receiving unit 108 may be implemented by circuits.

Transmission apparatus 100 may also include a storage (not shown) storing programs executed by the processor (programs by which the processor implements the respective constituent elements). For example, this storage may be implemented by a semiconductor memory or the like.

[1-3. Configuration of Reception Apparatus]

A configuration of reception apparatus 200 will be described next with reference to FIG. 4.

Figure 4:
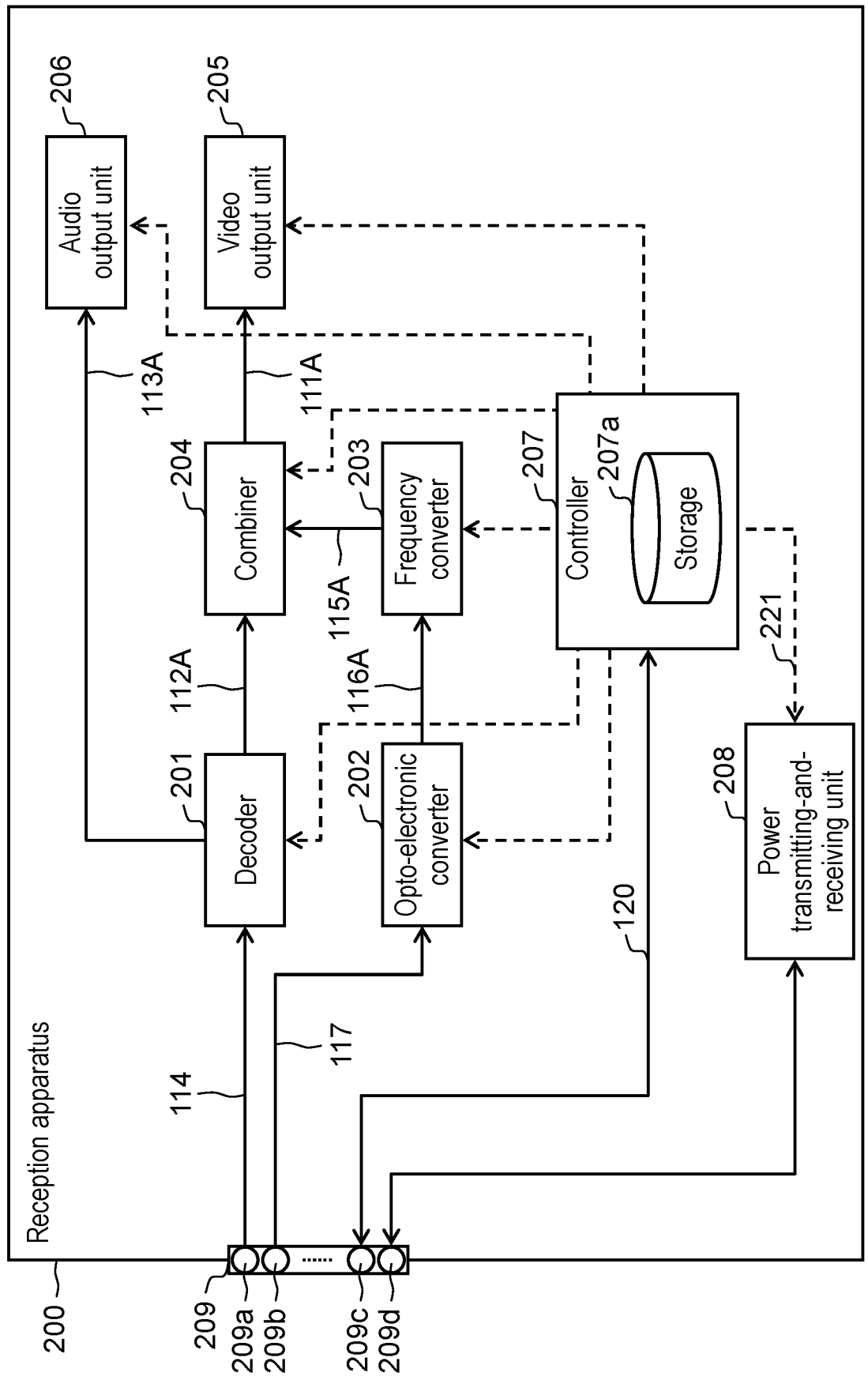
FIG. 4 is a block diagram schematically showing an example of a configuration of a reception apparatus according to the first exemplary embodiment.

FIG. 4 is a block diagram schematically showing an example of the configuration of reception apparatus 200 according to the first exemplary embodiment.

As shown in FIG. 4, reception apparatus 200 includes decoder 201, combiner 204, opto-electronic converter 202, frequency converter 203, video output unit 205, audio output unit 206, controller 207, power transmitting-and-receiving unit 208, and composite connector 209.

Composite connector 209 is a connector structure obtained by combining terminal 209a for obtaining electrical signal 114, terminal 209b for obtaining optical signal 117, and other terminals. Cable 300 is connected to composite connector 209. A portion of composite connector 209 which is associated with electrical signal 114 satisfies the HDMI (registered trademark) standard specifications.

Terminal 209a of composite connector 209 is electrically connected to terminal 109a of composite connector 109 via cable 300. Terminal 209b of composite connector 209 is optically connected to terminal 109b of composite connector 109 via cable 300. Terminal 209c of composite connector 209 is electrically connected to terminal 109c of composite connector 109 via cable 300. Terminal 209d of composite connector 209 is electrically connected to terminal 109d of composite connector 109 via cable 300. Composite connector 209 incorporates terminals 209a to 209d in one connector housing.

The number and the like of terminals included in composite connector 209 described above are merely examples, and the present disclosure is not limited to the above configuration. For example, composite connector 209 may include a plurality of terminals 209b for receiving optical signals 117.

Decoder 201 obtains electrical signal 114 complying with the HDMI (registered trademark) standard via terminal 209a of composite connector 209, decodes (reconstructs) obtained electrical signal 114, and separates the signal into low-band video signal 112A and audio baseband signal 113A. In other words, decoder 201 generates audio baseband signal 113A (reconstructs audio baseband signal 113A) by using obtained electrical signal 114, and generates low-band video signal 112A (reconstructs low-band video signal 112A). Decoder 201 then outputs audio baseband signal 113A to audio output unit 206, and low-band video signal 112A to combiner 204. Note that low-band video signal 112A is a signal that is substantially identical to low-band video signal 112 in transmission apparatus 100, and audio baseband signal 113A is a signal that is substantially identical to audio baseband signal 113 in transmission apparatus 100.

Opto-electronic converter 202 obtains optical signal 117 via terminal 209b of composite connector 209, and converts obtained optical signal 117 into an electrical signal. Opto-electronic converter 202 converts optical signal 117 into an electrical signal by using, for example, a photodiode or the like. This electrical signal is second high-band video signal 116A. That is, opto-electronic converter 202 generates second high-band video signal 116A (reconstructs second high-band video signal 116A) by using obtained optical signal 117. Second high-band video signal 116A is a signal that is substantially identical to second high-band video signal 116 in transmission apparatus 100 and has a frequency component indicated by part (e) of FIG. 3.

Frequency converter 203 converts a sampling frequency of second high-band video signal 116A from Fs/2 to Fs, and then filters second high-band video signal 116A after conversion through a high-pass filter circuit that passes signals in the band from Fs/4 to Fs/2 inclusive to generate first high-band video signal 115A (reconstructs first high-band video signal 115A). First high-band video signal 115A is a signal that is substantially identical to first high-band video signal 115 in transmission apparatus 100 and has a frequency component indicated by part (d) of FIG. 4 (a frequency component in the band from Fs/4 to Fs/2 inclusive).

Combiner 204 combines reconstructed low-band video signal 112A with reconstructed first high-band video signal 115A, and outputs video baseband signal 111A reconstructed by combining the signals. Video baseband signal 111A is a signal that is substantially identical to video baseband signal 111 in transmission apparatus 100.

Video output unit 205 outputs a video based on video baseband signal 111A. The video is, for example, a moving image constituted by a plurality of temporally consecutive images. Video output unit 205 is, for example, a display device including a liquid crystal panel, an electro luminescence (EL) panel, or the like.

Audio output unit 206 outputs an audio based on audio baseband signal 113A. Audio output unit 206 is, for example, a speaker device or the like.

Controller 207 transmits serial control signal 120 containing the receiver information of reception apparatus 200 to transmission apparatus 100 via terminal 209c of composite connector 209. Controller 207 also includes storage 207a storing the receiver information of reception apparatus 200. The receiver information indicates, for example, a maximum transmission rate at which reception apparatus 200 can receive electrical signals. Note that storage 207a may be provided outside controller 207. Storage 207a may be implemented by, for example, a semiconductor memory or the like.

Controller 207 outputs power control signal 221 indicating a power transmission or reception instruction to power transmitting-and-receiving unit 208. Controller 207 may output control signals to decoder 201, opto-electronic converter 202, frequency converter 203, combiner 204, video output unit 205, and audio output unit 206. Referring to FIG. 4, broken line arrows indicate control signals output from controller 207.

Note that controller 207 may receive control signals from transmission apparatus 100 via terminal 209c.

Power transmitting-and-receiving unit 208 performs power transmission to transmission apparatus 100 or power reception from transmission apparatus 100 on the basis of power control signal 221. Power transmitting-and-receiving unit 208 performs power transmission to transmission apparatus 100 or power reception from transmission apparatus 100 via terminal 209d of composite connector 209.

More specifically, each constituent element of reception apparatus 200 described above is implemented by a processor, a microcomputer, a semiconductor integrated circuit, a dedicated circuit, or the like. For example, each constituent element may be implemented as an independent processor or part of the functions of one processor.

For example, decoder 201, opto-electronic converter 202, frequency converter 203, and combiner 204 may be implemented by a processor, whereas storage 207a is implemented by a semiconductor memory, and controller 207 and power transmitting-and-receiving unit 208 may be implemented by circuits.

Reception apparatus 200 may also include a storage storing programs executed by a processor (programs by which the processor implements the respective constituent elements). This storage may be included in storage 207a or may be an independent unit from storage 207a. For example, this storage may be implemented by a semiconductor memory or the like.

[1-4. Effects and Others of First Exemplary Embodiment]

As described above, according to this exemplary embodiment, the transmission apparatus includes a video obtainer configured to obtain a video signal, a first converter configured to convert the video signal into an electrical signal complying with the HDMI (registered trademark) standard, a second converter configured to convert the video signal into an optical signal, and a signal processor configured to perform at least one of the conversion using the first converter and the conversion using the second converter with respect to the obtained video signal.

The transmission method according to this exemplary embodiment is a transmission method executed by the transmission apparatus. The transmission apparatus includes a first converter configured to convert a video signal into an electrical signal complying with the HDMI (registered trademark) standard and a second converter configured to convert the video signal into an optical signal. The transmission method includes obtaining the video signal and performing at least one of the conversion using the first converter and the conversion using the second converter with respect to the obtained video signal.

Note that transmission apparatus 100 is an example of the transmission apparatus. Video baseband signal 111 is an example of the video signal. Video obtainer 101 is an example of the video obtainer. Encoder 103 is an example of the first converter. Electro-optic converter 105 is an example of the second converter. Signal processor 110 is an example of the signal processor.

In recent years, 4K TVs higher in resolution than high-vision TVs have been commercialized, and 8K TVs higher in resolution than 4K TVs have also been put into practice. With advances in high definition television technology, video baseband signal 111 and audio baseband signal 113 increase in information amount per unit time (for example, one sec). As the information amount per unit time (for example, one sec) of signals to be transmitted increases, it is necessary to increase a transmission rate (increase the amount of information that can be transmitted per unit time). On the other hand, it is thought that there is a physical limitation on an increase in transmission rate using electrical signals, and hence it is difficult to cope with an increase in transmission rate using only electrical signals. Assume that such an increase in transmission rate is attempted by using electrical signals. In this case, in order to maintain an increased transmission rate, there may be a limitation that a transmission distance based on a cable needs to be reduced compared with the conventional one.

According to an example described in the first exemplary embodiment, transmission apparatus 100 includes video obtainer 101 that obtains video baseband signal 111, encoder 103 that converts video baseband signal 111 into electrical signal 114 complying with the HDMI (registered trademark) standard, electro-optic converter 105 that converts video baseband signal 111 into optical signal 117, and signal processor 110. Signal processor 110 performs at least one of conversion by encoder 103 and conversion by electro-optic converter 105 with respect to obtained video baseband signal 111.

Transmission apparatus 100 having the above configuration can transmit video baseband signal 111 with a relatively large information amount, which is difficult to transmit by only electrical signal 114 because of the above limitation on transmission rate and the like, by using optical signal 117.

In the transmission apparatus, the signal processor may perform video separating processing for the obtained video signal, and may operate in the video separating processing as follows:

(i) separating the obtained video signal into a first video signal for forming a first frequency component of an image contained in the video signal and a second video signal for forming a second frequency component that is contained in a frequency component of the image contained in the video signal and belongs to a band higher than a band to which the first frequency component belongs;

(ii) converting the first video signal into an electrical signal by using the first converter; and (iii) converting the second video signal into the optical signal by using the second converter.

Note that a frequency component in the band from 0 to Fs/4 inclusive when the sampling frequency of video baseband signal 111 is Fs is an example of the first frequency component, whereas a frequency component in the band from Fs/4 to Fs/2 inclusive is an example of the second frequency component. Low-band video signal 112 is an example of the first video signal. First high-band video signal 115 and second high-band video signal 116 each are an example of the second video signal.

For example, according to an example described in the first exemplary embodiment, in transmission apparatus 100, signal processor 110 performs video separating processing for obtained video baseband signal 111. Signal processor 110 separates obtained video baseband signal 111 into low-band video signal 112 for forming a first frequency component of an image contained in video baseband signal 111 and first high-band video signal 115 for forming a second frequency component that is contained in a frequency component of the image contained in video baseband signal 111 and belongs to a band higher than a band to which the first frequency component belongs, in the video separating processing. Signal processor 110 then converts low-band video signal 112 into electrical signal 114 by using encoder 103. In addition, signal processor 110 converts second high-band video signal 116 based on first high-band video signal 115 into optical signal 117 by using electro-optic converter 105.

Transmission apparatus 100 having the above configuration transmits low-band video signal 112 as an electrical signal based on the conventional HDMI (registered trademark) standard, and second high-band video signal 116 as an optical signal. This enables transmission apparatus 100 to transmit a video signal for forming a high-resolution image, which is difficult to transmit by a scheme using the conventional HDMI (registered trademark) standard, while maintaining backward compatibility (compatibility with conventional products).

Reception apparatus 200 can receive at least low-band video signal 112 from transmission apparatus 100 even if at least one of reception apparatus 200 and cable 300 does not support transmission of optical signal 117.

Reception apparatus 200 can also lower a transmission rate of optical signal 117 as compared with a configuration for transmitting an entire band of video baseband signal 111 as optical signal 117. For example, this makes it possible to use, as a member such as an optical fiber used for transmission of optical signal 117, a relatively inexpensive member with a relatively low maximum transmission rate.

In the transmission apparatus, the signal processor may perform sub-sampling processing to lower a sampling frequency of the second video signal below a sampling frequency of the video signal, and convert the second video signal having undergone the sub-sampling processing into the optical signal by using the second converter.

Note that first high-band video signal 115 is an example of the second video signal before sub-sampling processing, and second high-band video signal 116 is an example of the second video signal after the sub-sampling processing. Sampling frequency Fs is an example of the sampling frequency of a video signal. Sampling frequency Fs/2 is an example of the sampling frequency used for the sub-sampling processing.

For example, according to an example described in the first exemplary embodiment, in transmission apparatus 100, signal processor 110 performs the sub-sampling processing to lower a sampling frequency of first high-band video signal 115 below sampling frequency Fs of video baseband signal 111, and converts second high-band video signal 116 as the second video signal having undergone the sub-sampling processing into optical signal 117 by using electro-optic converter 105.

Transmission apparatus 100 having the above configuration can reduce an information amount of optical signal 117. This can lower a transmission rate of optical signal 117, and hence makes it possible to use, for example, as a member such as an optical fiber used for transmission of optical signal 117, a relatively inexpensive member with a relatively low maximum transmission rate.

In this exemplary embodiment, the reception apparatus is configured to output a signal obtained by reconstructing a video signal. The reception apparatus includes a first reconstructor configured to obtain an electrical signal containing a first video signal as part of the video signal and complying with the HDMI (registered trademark) standard, and reconstruct the first video signal by using the obtained electrical signal, a second reconstructor configured to obtain an optical signal containing a second video signal as part of the video signal and reconstruct the second video signal by using the obtained optical signal, and a combiner configured to generate a combined video signal by combining the reconstructed first video signal with the reconstructed second video signal and output the generated combined video signal as a reconstructed signal.

The reception method according to this exemplary embodiment is a reception method executed by the reception apparatus configured to output a signal obtained by reconstructing a video signal. This method includes obtaining an electrical signal containing a first video signal as part of the video signal and complying with the HDMI (registered trademark) standard, reconstructing the first video signal by using the obtained electrical signal, obtaining an optical signal containing a second video signal as part of the video signal, reconstructing the second video signal by using the obtained optical signal, generating a combined video signal by combining the reconstructed first video signal with the reconstructed second video signal, and outputting the generated combined video signal as a reconstructed signal.

Note that reception apparatus 200 is an example of the reception apparatus. Low-band video signal 112A is an example of the reconstructed first video signal. Decoder 201 is an example of the first reconstructor. Each of first high-band video signal 115A and second high-band video signal 116A is an example of the reconstructed second video signal. Opto-electronic converter 202 is an example of the second reconstructor. Video baseband signal 111A is an example of the combined video signal. Combiner 204 is an example of the combiner.

For example, according to an example described in the first exemplary embodiment, reception apparatus 200 is configured to output video baseband signal 111A obtained by reconstructing the video baseband signal 111. Reception apparatus 200 includes decoder 201 that obtains electrical signal 114 complying with the HDMI (registered trademark) standard and containing low-band video signal 112 as part of video baseband signal 111 and reconstructs low-band video signal 112A by using obtained electrical signal 114. Reception apparatus 200 includes opto-electronic converter 202 that obtains optical signal 117 containing second high-band video signal 116 as part of video baseband signal 111 and reconstructs second high-band video signal 116A by using obtained optical signal 117. In addition, reception apparatus 200 includes combiner 204 that generates video baseband signal 111A by combining reconstructed low-band video signal 112A with first high-band video signal 115A based on reconstructed second high-band video signal 116A and outputs generated video baseband signal 111A as a reconstructed signal.

Reception apparatus 200 having the above configuration can receive video baseband signal 111 with a relatively large information amount, which is difficult to receive by using only electrical signal 114 because of, for example, the above limitation on the transmission rate, by using optical signal 117.

In the reception apparatus, a first video signal may form a first frequency component of an image contained in the video signal, and a second video signal may form a second frequency component that is contained in a frequency component in the image contained in the video signal and belongs to a band higher than a band to which the first frequency component belongs.

Note that a frequency component in the band from 0 to Fs/4 inclusive when a sampling frequency of video baseband signal 111 is Fs is an example of the first frequency component, whereas a frequency component in the band from Fs/4 to Fs/2 inclusive is an example of the second frequency component.

For example, according to the example described in the first exemplary embodiment, in reception apparatus 200, low-band video signal 112 may form a first frequency component (a frequency component in the band from 0 to Fs/4 inclusive) of an image contained in video baseband signal 111, and first high-band video signal 115 (second high-band video signal 116) may form a second frequency component (a frequency component in the band from Fs/4 to Fs/2 inclusive) that is contained in a frequency component of the image contained in video baseband signal 111 and belongs to a band higher than a band to which the first frequency component belongs.

Reception apparatus 200 having the above configuration can generate low-band video signal 112A from electrical signal 114 on the basis of the conventional HDMI (registered trademark) standard and form second high-band video signal 116A from optical signal 117. In this manner, reception apparatus 200 can reconstruct a high-resolution image, which is difficult to transmit by a scheme using the conventional HDMI (registered trademark) standard, while maintaining backward compatibility (compatibility with conventional products).

In the reception apparatus, the second video signal may be a signal whose sampling frequency is lowered below a sampling frequency of the video signal by performing sub-sampling processing.

For example, according to an example described in the first exemplary embodiment, in reception apparatus 200, second high-band video signal 116A is a signal substantially identical to second high-band video signal 116, whose sampling frequency is lowered below sampling frequency Fs of video baseband signal 111 by performing the sub-sampling processing.

This configuration can reduce the information amount of optical signal 117 received by reception apparatus 200. This can lower the transmission rate of optical signal 117, and hence makes it possible to use, for example, as a member such as an optical fiber used for transmission of optical signal 117, a relatively inexpensive member with a relatively low maximum transmission rate.

Second Exemplary Embodiment

[2-1-1. Operation Example 1 of Second Exemplary Embodiment]

A second exemplary embodiment will exemplify a specific operation of transmission apparatus 100 described in the first exemplary embodiment. Operation example 1 will be described first.

In operation example 1, separator 102 of transmission apparatus 100 separates video baseband signal 111 into low-band video signal 112 for forming an image with a fixed resolution (to be also referred to as a "predetermined resolution" hereinafter) and first high-band video signal 115 for forming an image component (high-frequency component), of the image, which has a resolution higher than the fixed resolution. The fixed resolution is, for example, a 2K resolution. More specifically, the 2K resolution is 1920×1080/60p (a moving image that displays 60 images with 1920 pixels×1080 pixels per sec). In this case, low-band video signal 112 is a full high vision signal of 1080p/60 Hz (a moving image signal that displays 60 images with 1920 pixels×1080 pixels per sec). Note that in the present disclosure, the fixed resolution is not limited to the 2K resolution.

Figure 5:
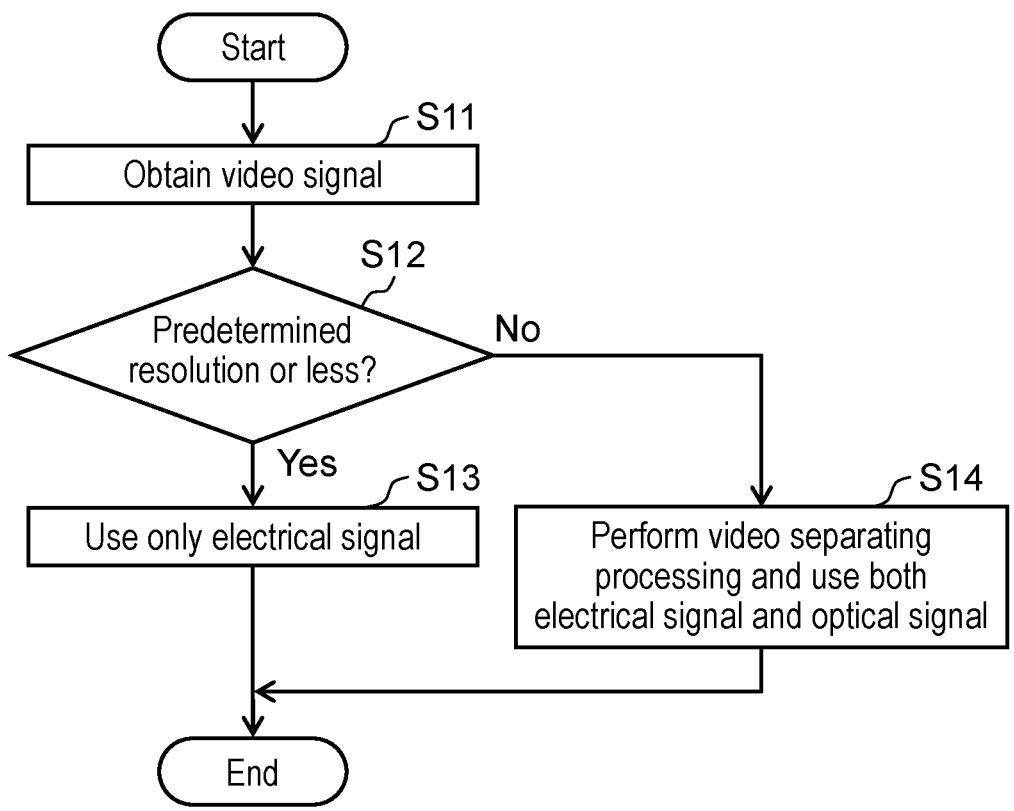
FIG. 5 is a flowchart for operation example 1 of a transmission apparatus according to a second exemplary embodiment.

FIG. 5 is a flowchart showing operation example 1 of transmission apparatus 100 according to the second exemplary embodiment.

In transmission apparatus 100, first of all, video obtainer 101 obtains video baseband signal 111 for forming an image (step S11).

Signal processor 110 then determines whether a resolution of the image formed by video baseband signal 111 obtained in step S11 is equal to or less than a predetermined resolution (step S12).

Upon determining in step S12 that the resolution of the image is equal to or less than the predetermined resolution (YES in step S12), signal processor 110 converts obtained entire video baseband signal 111 into electrical signal 114 by using encoder 103. At this time, transmission apparatus 100 transmits video baseband signal 111 by using only electrical signal 114 (step S13).

In contrast to the above, upon determining in step S12 that the resolution of the image is higher than the predetermined resolution (NO in step S12), signal processor 110 performs the video separating processing described in the first exemplary embodiment with respect to video baseband signal 111 obtained in step S11. That is, transmission apparatus 100 uses both electrical signal 114 and optical signal 117 to transmit video baseband signal 111 (step S14).

In video separating processing, signal processor 110 separates video baseband signal 111 into 1080p/60 Hz low-band video signal 112 and first high-band video signal 115 for forming a signal component obtained by removing (e.g. subtracting) a signal component (1080p/60 Hz signal component) of low-band video signal 112 from video baseband signal 111. As described in the first exemplary embodiment, signal processor 110 converts first high-band video signal 115 into second high-band video signal 116.

Signal processor 110 outputs low-band video signal 112 to encoder 103. Encoder 103 converts low-band video signal 112 into electrical signal 114 complying with the HDMI (registered trademark) standard. Electrical signal 114 is output from terminal 109a of composite connector 109.

Signal processor 110 outputs second high-band video signal 116 to electro-optic converter 105. Electro-optic converter 105 converts second high-band video signal 116 into optical signal 117. Optical signal 117 is output from terminal 109b of composite connector 109.

Note that in transmission apparatus 100 according to this exemplary embodiment, the predetermined resolution is set to a resolution (for example, the 2K resolution) sufficiently lower than a resolution (for example, a 4K resolution) corresponding to a maximum transmission rate defined in the HDMI (registered trademark) standard. In other words, encoder 103 transmits a video baseband signal for forming an image having a predetermined resolution as electrical signal 114 at a transmission rate equal to or less than a predetermined transmission rate (for example, a transmission rate corresponding to the 2K resolution) lower than a maximum transmission rate (for example, a transmission rate corresponding to the 4K resolution) defined in the HDMI (registered trademark) standard. For example, encoder 103 transmits a video baseband signal for forming an image having the predetermined resolution as electrical signal 114 at a transmission rate equal to or less than $\frac{1}{5}$ a maximum transmission rate defined in the HDMI (registered trademark) standard.

When a 1080p/60 Hz video baseband signal is converted into electrical signal 114 complying with the HDMI (registered trademark) standard, a transmission rate of one lane (one channel used for transmission of electrical signal 114) of electrical signal 114 when a clock frequency is 74.25 MHz is 742.5 Mega bits per second (Mbps). In contrast to this, for example, a transmission rate per lane of a 4K-resolution video baseband signal (3840×2160p/60 Hz (a moving image signal that displays 60 images with 3840 pixels×2160 pixels per sec)) is 6 Giga bits per second (Gbps). In addition, a transmission rate per lane of an 8K-resolution video baseband signal (7680×4320p/60 Hz (a moving image signal that displays 60 images with 7680 pixels×4320 pixels per sec)) is 24 Gbps. That is, a 1080p/60 Hz video baseband signal is sufficiently lower in transmission rate than a 4K-resolution video baseband signal and an 8K-resolution video baseband signal.

More specifically, a transmission rate of a 1080p/60 Hz video baseband signal is about $\frac{1}{8}$ a transmission rate of a 4K-resolution video baseband signal, and is about $\frac{1}{30}$ a transmission rate of an 8K-resolution video baseband signal.

An attenuation amount of signals transmitted through cable 300 decreases with a reduction in transmission rate owing to physical properties. Accordingly, lowering a transmission rate of electrical signal 114 allows an increase in the length of cable 300. That is, transmission-and-reception system 10 can achieve an increase in the length of cable 300.

[2-1-2. Effects and Others of Operation Example 1 of Second Exemplary Embodiment]

As described above, according to the second exemplary embodiment, in the video separating processing, the signal processor of the transmission apparatus may separate the obtained video signal into the first video signal for forming an image with a predetermined resolution and the second video signal obtained by removing a signal component of the first video signal from the obtained video signal.

Note that the 2K resolution is an example of the predetermined resolution.

For example, in operation example 1 of the second exemplary embodiment, in the video separating processing, signal processor 110 of transmission apparatus 100 separates obtained video baseband signal 111 into low-band video signal 112 for forming an image with a predetermined resolution (for example, the 2K resolution) and first high-band video signal 115 obtained by removing a signal component of low-band video signal 112 from obtained video baseband signal 111.

Transmission apparatus 100 having the above configuration converts low-band video signal 112 for forming an image with a predetermined resolution into electrical signal 114 and transmits electrical signal 114. Accordingly, even if reception apparatus 200 connected to transmission apparatus 100 via cable 300 cannot process optical signal 117 or cannot receive optical signal 117, reception apparatus 200 can output (display) a video (moving image) formed from an image with the predetermined resolution on the basis of electrical signal 114 received from transmission apparatus 100.

Assume that transmission apparatus 100 transmits optical signal 117 to reception apparatus 200 via cable 300. In this case, if a displacement occurs in a fitting portion between composite connector 109 and cable 300 or terminal 109b is contaminated, optical signal 117 may be attenuated. In addition, an optical fiber used as a transmission path for optical signal 117 is more breakable than a metal wire through which electrical signals are transmitted, and may break when, for example, being bent. When the optical fiber breaks, transmission apparatus 100 cannot transmit optical signal 117 to reception apparatus 200. Assume that such a situation has occurred and reception apparatus 200 cannot properly receive optical signal 117 from transmission apparatus 100. Even in this case, according to this operation example, reception apparatus 200 can display a 1080p/60 Hz 2K-resolution image transmitted from transmission apparatus 100 by using electrical signal 114. This can improve convenience for a user who uses transmission-and-reception system 10.

In the transmission apparatus, a transmission rate at which a video signal forming the image having the predetermined resolution is transmitted as the electrical signal by using the first converter may be equal to or less than a predetermined transmission rate lower than a maximum transmission rate of an electrical signal which is defined in the HDMI (registered trademark) standard.

Note that the transmission rate corresponding to the 4K resolution is an example of the maximum transmission rate. The transmission rate corresponding to the 2K resolution is an example of the predetermined transmission rate.

For example, according to operation example 1 of the second exemplary embodiment, in transmission apparatus 100, a transmission rate at which a video baseband signal forming the image having the predetermined resolution is transmitted as electrical signal 114 by encoder 103 is equal to or less than a predetermined transmission (for example, a transmission rate corresponding to the 2K resolution) lower than a maximum transmission rate (for example, a transmission rate corresponding to the 4K resolution) defined in the HDMI (registered trademark) standard.

Transmission apparatus 100 having the above configuration can achieve a reduction in transmission rate of electrical signal 114, and hence can achieve an increase in length of cable 300.

[2-2-1. Operation Example 2 of Second Exemplary Embodiment]

Operation example 2 will be described next. Operation example 2 will exemplify a case in which signal processor 110 of transmission apparatus 100 decides a resolution of low-band video signal 112 in accordance with performance of reception apparatus 200.

Figure 6:
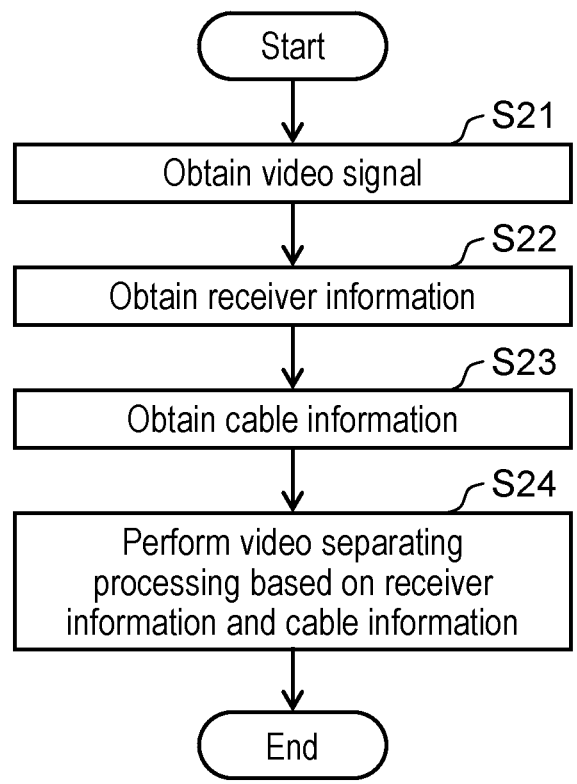
FIG. 6 is a flowchart for operation example 2 of the transmission apparatus according to the second exemplary embodiment.

FIG. 6 is a flowchart showing operation example 2 of transmission apparatus 100 according to the second embodiment.

In transmission apparatus 100, video obtainer 101 obtains video baseband signal 111 for forming an image (step S21).

Controller 107 obtains receiver information of reception apparatus 200 by obtaining serial control signal 120 (step S22). Controller 107 obtains serial control signal 120 via terminal 209c, cable 300, and terminal 109c. The receiver information indicates a maximum transmission rate of electrical signals that reception apparatus 200 can receive.

Controller 107 obtains cable information 320 of cable 300 via terminal 109e (step S23). More specifically, when cable 300 is connected to composite connector 109, controller 107 obtains cable information 320 indicating a maximum transmission rate of electrical signals via cable 300 from storage 301, which cable 300 has, via terminal 109e.

Signal processor 110 performs video separating processing on the basis of the receiver information obtained in step S22 and cable information 320 obtained in step S23 (step S24).

More specifically, signal processor 110 decides a resolution of low-band video signal 112 on the basis of the receiver information obtained in step S22 and cable information 320 obtained in step S23. This resolution is decided such that a transmission rate corresponding to the resolution becomes equal to or less than a maximum transmission rate determined by receiver information and equal to or less than a maximum transmission rate determined by cable information 320.

Note that a sequence of steps shown in the flowchart of FIG. 6 is merely an example, and the present disclosure is not limited to this sequence. For example, step S23 may be executed before step S22, and steps S22 and S23 each may be executed before step S21. Alternatively, steps S21, S22, and S23 may be concurrently executed.

After a resolution is decided, signal processor 110 separates video baseband signal 111 into low-band video signal 112 with the decided resolution and first high-band video signal 115 forming a signal component obtained by removing a signal component of low-band video signal 112 from video baseband signal 111 in the video separating processing. A subsequent operation of signal processor 110 is substantially the same as the operation of signal processor 110 described in operation example 1. That is, encoder 103 converts low-band video signal 112 into electrical signal 114 complying with the HDMI (registered trademark) standard, and outputs electrical signal 114 from terminal 109a. Signal processor 110 converts first high-band video signal 115 into second high-band video signal 116. Electro-optic converter 105 converts second high-band video signal 116 into optical signal 117, and outputs optical signal 117 from terminal 109b.

Note that storage 207a of reception apparatus 200 may store, in addition to receiver information, resolution information indicating a maximum resolution that allows signal processing when reception apparatus 200 obtains both electrical signal 114 and optical signal 117 and performs signal processing. Such resolution information may be output as part of serial control signal 120 from reception apparatus 200 via terminal 109c. That is, reception apparatus 200 may include terminal 109c for outputting receiver information and resolution information to transmission apparatus 100 provided outside reception apparatus 200.

For example, a resolution corresponding to a transmission rate indicated by the receiver information may be the 4K resolution, and a resolution indicated by the resolution information may be the 8K resolution. In such a case, based on the receiver information and the resolution information, when transmitting a 4K-resolution video is to be transmitted to reception apparatus 200, transmission apparatus 100 can determine that only electrical signal 114 may be used. In addition, when outputting an 8K-resolution video to reception apparatus 200, transmission apparatus 100 can determine that both electrical signal 114 and optical signal 117 must be used.

For example, a resolution corresponding to a transmission rate indicated by the receiver information may be the 4K resolution, and a resolution indicated by the resolution information may be the 4K resolution. In such a case, transmission apparatus 100 can determine that reception apparatus 200 does not correspond to signal processing for optical signal 117. Upon obtaining such receiver information and resolution information, therefore, when transmitting a video signal based on 8K-resolution video baseband signal 111 to reception apparatus 200, transmission apparatus 100 can determine that video baseband signal 111 may be down-converted into a 4K-resolution signal, and electrical signal 114 generated from the down-converted video signal may be transmitted to reception apparatus 200. In this case, transmission apparatus 100 can temporarily stop or skip an operation (processing of converting a video signal into optical signal 117) of electro-optic converter 105, and hence can reduce an amount of signal processing performed by transmission apparatus 100.

For example, video baseband signal 111 may have the 8K resolution, a resolution corresponding to a transmission rate indicated by the receiver information may be the 2K resolution, and a resolution indicated by the resolution information may be the 4K resolution. In such a case, transmission apparatus 100 can determine that video baseband signal 111 may be separated into 2K-resolution low-band video signal 112 and first high-band video signal 115, and first high-band video signal 115 may be down-converted, with the 4K resolution being an upper limit.

As described above, in a configuration in which reception apparatus 200 outputs the receiver information and the resolution information to transmission apparatus 100, transmission apparatus 100 can cause signal processor 110 to perform appropriate signal processing in accordance with performance of reception apparatus 200 by operating based on the received receiver information and resolution information. Note that resolution information may be part of the receiver information.

Note that, for example, controller 107 can perform these determinations based on the receiver information and the resolution information in transmission apparatus 100.

[2-2-2. Effects and Others of Operation Example 2 of Second Exemplary Embodiment]

As described above, according to the second exemplary embodiment, the transmission apparatus may include a connector to which a cable configured to connect a reception apparatus provided outside the transmission apparatus to the transmission apparatus is connected and which includes a terminal configured to output the electrical signal to the reception apparatus and a terminal configured to output the optical signal to the reception apparatus, a cable information obtainer configured to obtain cable information, from a storage included in the cable, indicating a maximum transmission rate of the electrical signals via the cable, when the cable is connected to the connector, and a receiver information obtainer configured to obtain receiver information indicating a maximum transmission rate of the electrical signal at the reception apparatus, the maximum transmission rate indicates a maximum value of a transmission rate of the electrical signal that the reception apparatus provided outside the transmission apparatus can receive. The signal processor may perform the video separating processing on the basis of the obtained receiver information and the obtained cable information.

Note that cable 300 is an example of the cable. Composite connector 109 is an example of the connector. Terminal 109*a* is an example of the terminal for outputting an electrical signal to the reception apparatus. Terminal 109*b* is an example of the terminal for outputting an optical signal to the reception apparatus. Storage 301 is an example of the storage. Controller 107 is an example of the cable information obtainer and also an example of the receiver information obtainer.

For example, in operation example 2 of the second exemplary embodiment, transmission apparatus 100 includes composite connector 109 to which cable 300 for connecting reception apparatus 200 provided outside transmission apparatus 100 to transmission apparatus 100 is connected. Composite connector 109 includes terminal 109*a* for outputting electrical signal 114 to reception apparatus 200 and terminal 109*b* for outputting optical signal 117 to reception apparatus 200. Transmission apparatus 100 includes controller 107 that obtains cable information 320, from storage 301 included in cable 300, indicating a maximum transmission rate of the electrical signals via cable 300, when cable 300 is connected to composite connector 109.

Transmission apparatus 100 includes controller 107 that obtains the receiver information indicating a maximum transmission rate of the electrical signal at reception apparatus 200, the maximum transmission rate indicates a maximum value of a transmission rate of the electrical signal that reception apparatus 200 provided outside transmission apparatus 100 can receive.

Signal processor 110 then performs the video separating processing on the basis of the obtained receiver information and obtained cable information 320.

In transmission apparatus 100 having the above configuration, signal processor 110 can decide a resolution of low-band video signal 112 on the basis of the receiver information contained in serial control signal 120, and cable information 320. This enables transmission apparatus 100 to output an appropriate video signal to reception apparatus 200.

According to the second exemplary embodiment, the reception apparatus may include a storage storing receiver information indicating a maximum transmission rate of the electrical signal at the reception apparatus and resolution information indicating a maximum resolution that allows signal processing when the reception apparatus performs the signal processing upon obtaining both the electrical signal and the optical signal, and a terminal for outputting the receiver information and the resolution information to a transmission apparatus provided outside the reception apparatus. The maximum transmission rate indicated by the receiver information indicates a maximum value of a transmission rate of the electrical signal that the reception apparatus can receive.

Note that storage 207*a* is an example of the storage. Terminal 109*c* is an example of the terminal for outputting the receiver information and the resolution information.

For example, according to operation example 2 of the second exemplary embodiment, reception apparatus 200 includes storage 207*a* storing the receiver information indicating a maximum transmission rate of the electrical signal at reception apparatus 200 and the resolution information indicating a maximum resolution that allows signal processing when reception apparatus 200 performs the signal processing upon obtaining both the electrical signal and the optical signal. In addition, reception apparatus 200 includes terminal 109*c* for outputting the receiver information and the resolution information to transmission apparatus 100 provided outside reception apparatus 200. The maximum transmission rate indicated by the receiver information indicates a maximum value of a transmission rate of the electrical signal that the reception apparatus 200 can receive.

In reception apparatus 200 having the above configuration, transmission apparatus 100 can obtain the receiver information and the resolution information from reception apparatus 200. This enables transmission apparatus 100 to perform appropriate signal processing corresponding to performance of reception apparatus 200 and output an appropriate video signal corresponding to performance of reception apparatus 200, based on the obtained receiver information and resolution information.

The cable may also include a storage storing cable information indicating a maximum transmission rate of electrical signals via the cable.

For example, cable 300 includes storage 301 storing cable information 320 indicating a maximum transmission rate of electrical signals via cable 300.

This enables transmission apparatus 100 to obtain cable information 320 from storage 301 of cable 300 and decide a resolution of low-band video signal 112 on the basis of obtained cable information 320.

Third Exemplary Embodiment

[3-1. Operation Example of Third Exemplary Embodiment]

A third exemplary embodiment will exemplify an operation of transmission apparatus 100 described in the first exemplary embodiment, which is different from the operation example in the second exemplary embodiment. In transmission apparatus 100, signal processor 110 may convert entire video baseband signal 111 into optical signal 117 by using electro-optic converter 105. The third exemplary embodiment will exemplify an operation in such a case.

Figure 7:
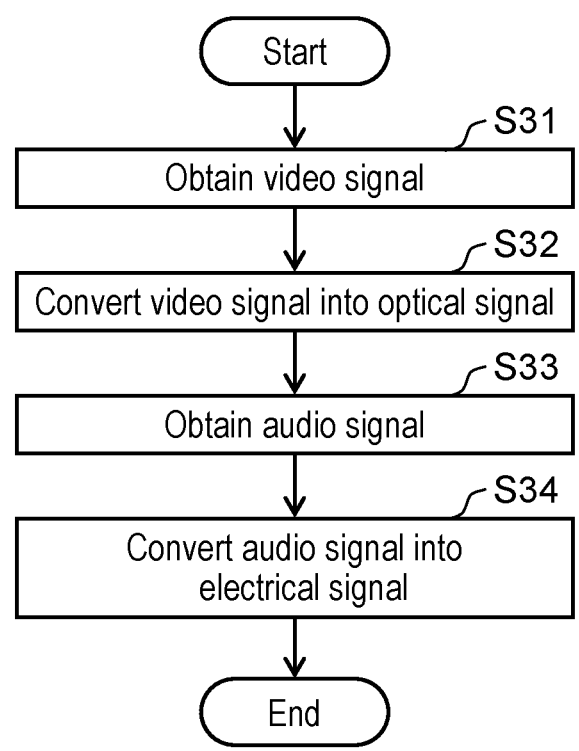
FIG. 7 is a flowchart for an operation example of a transmission apparatus according to a third exemplary embodiment.

FIG. 7 is a flowchart showing an operation example of transmission apparatus 100 according to the third exemplary embodiment.

In transmission apparatus 100, video obtainer 101 obtains video baseband signal 111 for forming an image (step S31).

Signal processor 110 converts entire video baseband signal 111 obtained in step S31 into optical signal 117 by using electro-optic converter 105 (step S32).

When entire video baseband signal 111 is converted into optical signal 117, there is no need to perform the video separating processing by using signal processor 110, which has been described in the first exemplary embodiment. According to an operation example shown in the flowchart of FIG. 7, in signal processor 110, separator 102 outputs video baseband signal 111 as first high-band video signal 115 to frequency converter 104 without any change, and frequency converter 104 outputs first high-band video signal 115 as second high-band video signal 116 to electro-optic converter 105 without any change. At this time, separator 102 may not output any signal to encoder 103 or may output a signal corresponding to a black image as low-band video signal 112.

Audio obtainer 106 obtains audio baseband signal 113 corresponding to video baseband signal 111 (step S33).

Encoder 103 converts audio baseband signal 113 obtained in step S33 into electrical signal 114 (step S34).

In this operation example, encoder 103 stores, in a data structure of electrical signal 114, dummy data in an area where low-band video signal 112 is stored, and audio baseband signal 113, as usual, in an area where audio baseband signal 113 is stored. The dummy data is data corresponding to, for example, a black image.

Note that the flowchart of FIG. 7 shows steps sequenced only for the sake of describing each processing. For example, steps S31 and S32 may be executed concurrently with steps S33 and S34. Alternatively, in the flowchart, steps S33 and S34 may be executed before steps S31 and S32.

According to an operation example of the third exemplary embodiment, combiner 204 of reception apparatus 200 does not use electrical signal 114 to generate video baseband signal 111A. Combiner 204 generates video baseband signal 111 from only first high-band video signal 115A based on second high-band video signal 116A obtained by converting optical signal 117 by using opto-electronic converter 202. At this time, frequency converter 203 outputs second high-band video signal 116A as first high-band video signal 115A without any change.

According to an operation example of the third exemplary embodiment, transmission apparatus 100 may transmit electrical signal 114 to reception apparatus 200 upon letting electrical signal 114 contain information (for example, a flag) indicating that electrical signal 114 contains dummy data. Upon receiving electrical signal 114 containing this information, reception apparatus 200 can recognize that electrical signal 114 contains the dummy data. This informs reception apparatus 200 that video baseband signal 111 should be obtained from only optical signal 117.

[3-2. Effects and Others of Operation Example of Third Exemplary Embodiment]

As described above, according to the third exemplary embodiment, the transmission apparatus may include an audio obtainer configured to obtain an audio signal. The first converter may convert the audio signal into the electrical signal. The signal processor may convert the obtained audio signal into the electrical signal by using the first converter, and may convert the obtained video signal into the optical signal by using the second converter.

Note that audio obtainer 106 is an example of the audio obtainer. Audio baseband signal 113 is an example of the audio signal.

For example, transmission apparatus 100 includes audio obtainer 106 that obtains audio baseband signal 113. Encoder 103 converts audio baseband signal 113 into electrical signal 114. Signal processor 110 converts obtained audio baseband signal 113 into electrical signal 114 by using encoder 103, and converts obtained video baseband signal 111 into optical signal 117 by using electro-optic converter 105.

Transmission apparatus 100 having the above configuration can use electrical signal 114 complying with the conventional HDMI (registered trademark) standard only for transmission of audio baseband signal 113. This enables transmission apparatus 100 to select a transmission clock used for electrical signal 114 in consideration of only quality of audio because there is no need to give consideration to transmission of a video.

In general, it is difficult to select a transmission clock for an electrical signal containing both video baseband signal 111 and audio baseband signal 113. For example, for electrical signal 114 containing high-resolution video baseband signal 111, a transmission clock having a relatively high frequency is selected for transmission of high-resolution video baseband signal 111. However, a transmission clock having such a high frequency is not required for transmission of audio baseband signal 113. On the other hand, for electrical signal 114 containing low-resolution video baseband signal 111, as a frequency of a transmission clock is lowered in accordance with a resolution of video baseband signal 111, a transmission capacity of audio baseband signal 113 becomes relatively small. As in the operation example of the third exemplary embodiment, therefore, audio quality can be effectively improved by freely setting a transmission clock for electrical signal 114 in consideration of only quality of audio.

When audio baseband signal 113 is to be transmitted as optical signal 117, reception apparatus 200 needs to generate a clock signal for reproduction of audio baseband signal 113 from optical signal 117. In this configuration, for example, occurrence of jitter in a clock signal may cause deterioration in audio quality. As compared with such a configuration, the operation example of the third exemplary embodiment is effective in improving audio quality because audio baseband signal 113 is transmitted as electrical signal 114, and video baseband signal 111 is transmitted as optical signal 117.

Fourth Exemplary Embodiment

[4-1. Configuration of Transmission Apparatus]

A configuration of transmission apparatus 100A according to a fourth exemplary embodiment will be described with reference to FIG. 8.

Figure 8:
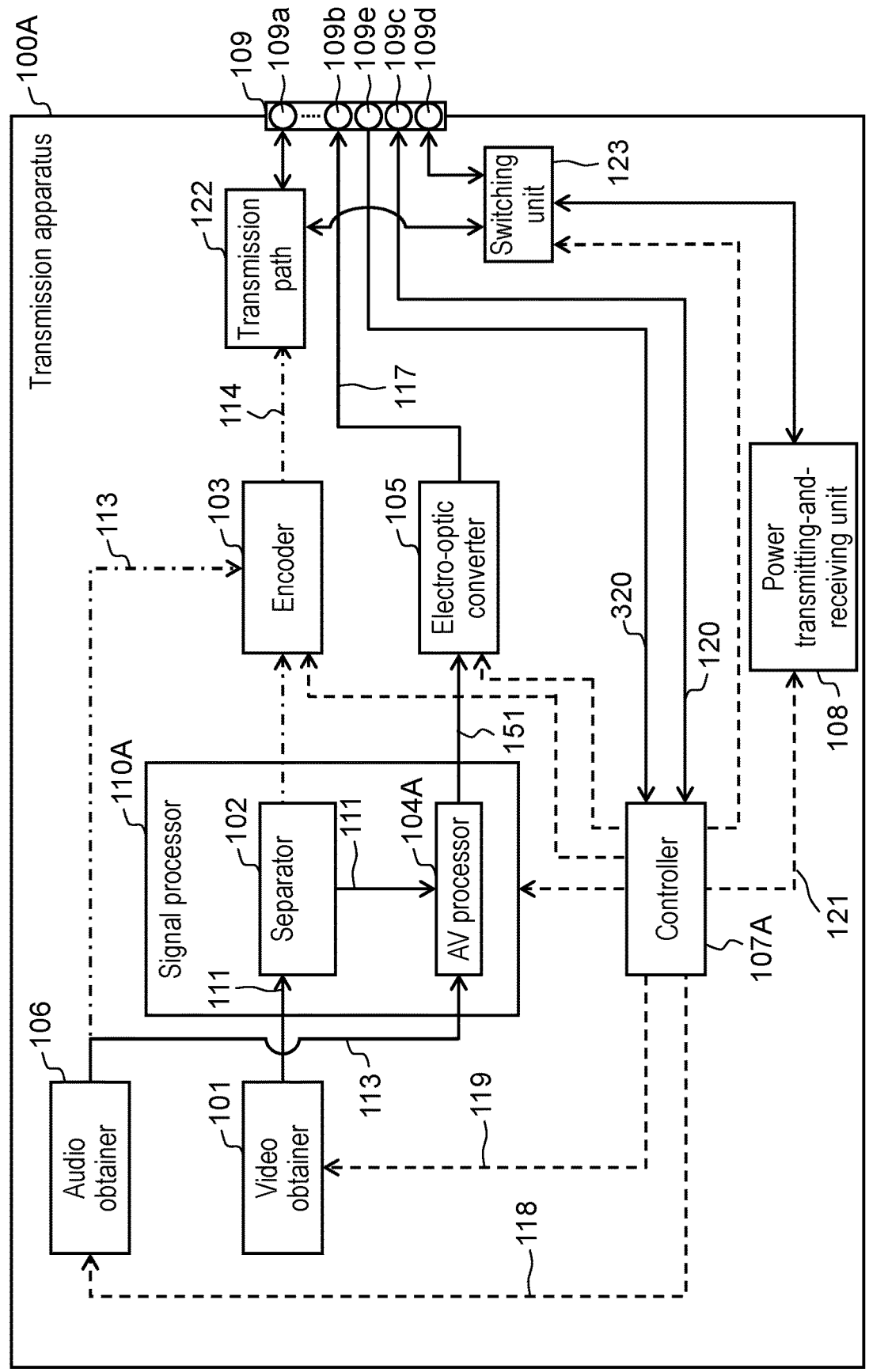
FIG. 8 is a block diagram schematically showing an example of a configuration of a transmission apparatus according to a fourth exemplary embodiment.

FIG. 8 is a block diagram schematically showing an example of the configuration of transmission apparatus 100A according to the fourth exemplary embodiment. Note that the following description mainly focuses on differences between transmission apparatus 100A according to the fourth exemplary embodiment and transmission apparatus 100 according to the first exemplary embodiment.

Figure 9:
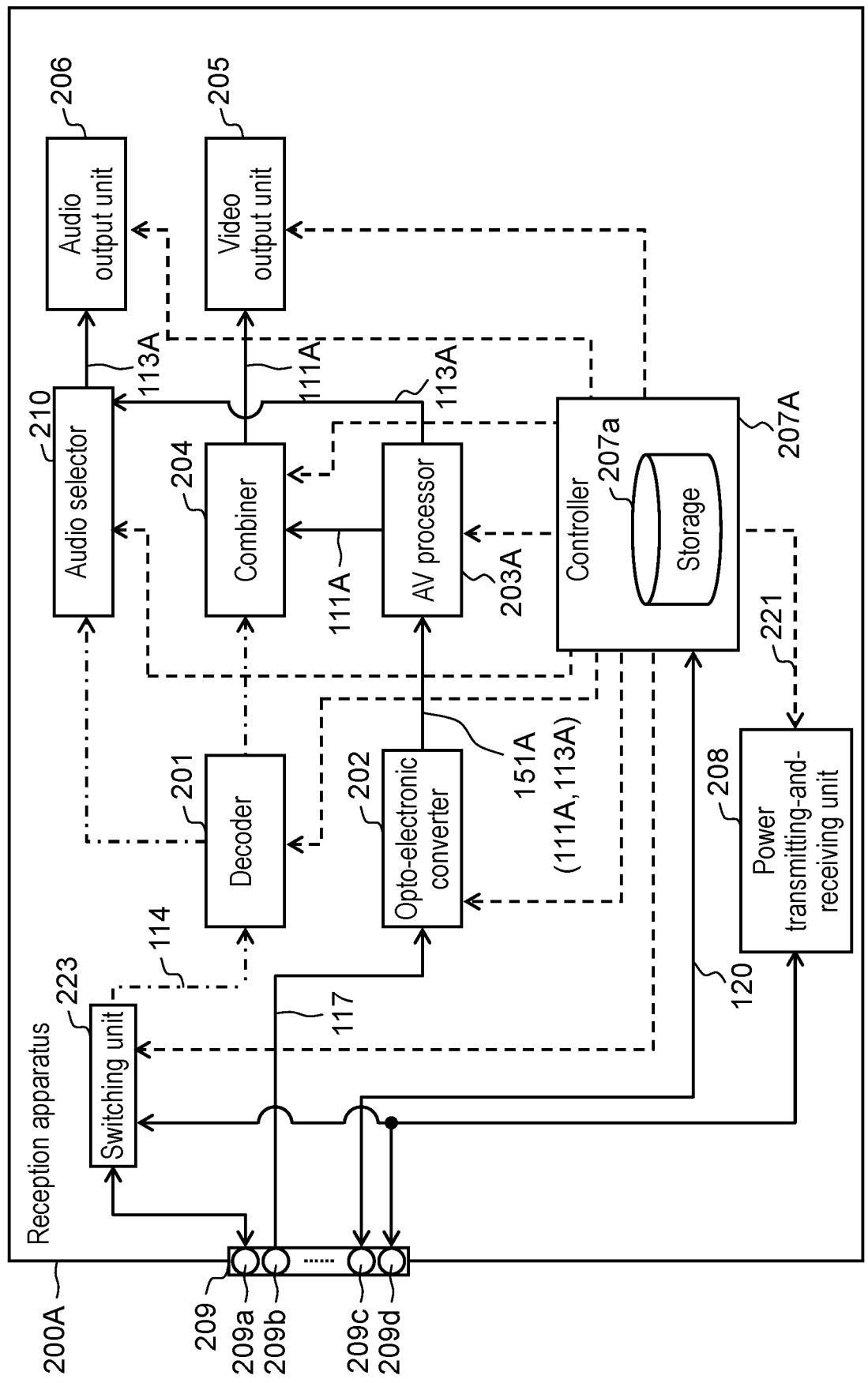
FIG. 9 is a block diagram schematically showing an example of a configuration of a reception apparatus according to the fourth embodiment.

The following will describe an operation example in which a connection partner of transmission apparatus 100A is reception apparatus 200A shown in FIG. 9, and transmission apparatus 100A performs power transmission to reception apparatus 200A or power reception from reception apparatus 200A via terminal 109a. Referring to FIG. 8, chain line arrows indicate routes of signals that are used in the operation example described in the first exemplary embodiment but are not used in the operation example described in the fourth exemplary embodiment.

Note that the same reference numerals as in the first exemplary embodiment denote constituent elements that perform substantially the same operations in the following description, and a description of the constituent elements will be omitted or simplified.

As shown in FIG. 8, transmission apparatus 100A according to the fourth exemplary embodiment includes AV processor 104A in signal processor 110A in place of frequency converter 104 that transmission apparatus 100 according to the first exemplary embodiment has in signal processor 110. In addition, transmission apparatus 100A includes a switching unit 123 that transmission apparatus 100 according to the first exemplary embodiment does not have. Transmission apparatus 100A according to the fourth exemplary embodiment mainly differs in these points from transmission apparatus 100 according to the first exemplary embodiment.

That is, transmission apparatus 100A includes video obtainer 101, signal processor 110A, encoder 103, electro-optic converter 105, audio obtainer 106, controller 107A, power transmitting-and-receiving unit 108, composite connector 109, and switching unit 123. Signal processor 110 includes separator 102 and AV processor 104A.

Controller 107A receives serial control signal 120 transmitted from a connection partner (for example, reception apparatus 200A shown in FIG. 9) of transmission apparatus 100A, and outputs audio control signal 118 to audio obtainer 106, and video control signal 119 to video obtainer 101, on the basis of received serial control signal 120. In addition, controller 107A outputs power control signal 121 indicating a power transmission instruction or power reception instruction to power transmitting-and-receiving unit 108 on the basis of received serial control signal 120. Controller 107A may output control signals to signal processor 110A, encoder 103, electro-optic converter 105, and switching unit 123 on the basis of received serial control signal 120. Referring to FIG. 8, broken line arrows indicate controls signals output from controller 107A. Controller 107A may transmit a control signal to a connection partner (for example, reception apparatus 200A) of transmission apparatus 100A via terminal 109c.

In transmission apparatus 100A, both video baseband signal 111 and audio baseband signal 113 are converted into optical signal 117.

Video obtainer 101 obtains video baseband signal 111 and outputs obtained video baseband signal 111 to separator 102 of signal processor 110A. Separator 102 outputs video baseband signal 111 to AV processor 104A without any change.

Audio obtainer 106 obtains audio baseband signal 113 and outputs obtained audio baseband signal 113 to AV processor 104A of signal processor 110A.

AV processor 104A combines video baseband signal 111 output from separator 102 with audio baseband signal 113 output from audio obtainer 106, and outputs electrical signal 151 obtained by combining the signals to electro-optic converter 105. Note that a combining technique adopted by AV processor 104A is not specifically limited. AV processor 104A may use any technique to combine video baseband signal 111 with audio baseband signal 113. Electro-optic converter 105 converts electrical signal 151 combined by AV processor 104A into optical signal 117.

In this manner, in transmission apparatus 100A, AV processor 104A generates electrical signal 151 by combining video baseband signal 111 with audio baseband signal 113, and electro-optic converter 105 converts electrical signal 151 into optical signal 117. For this reason, in the configuration example of the fourth exemplary embodiment (that is, a connection partner of transmission apparatus 100A is reception apparatus 200A shown in FIG. 9), transmission apparatus 100A does not use encoder 103. Accordingly, a transmission line (to be referred to as "transmission path 122" hereinafter) for electrically connecting encoder 103 to terminal 109a, which is used as a transmission path for electrical signal 114 in the first exemplary embodiment, is not used in an operation example described in this exemplary embodiment, and hence can be used for other applications. In this exemplary embodiment, therefore, transmission apparatus 100A uses transmission path 122 for power transmission by power transmitting-and-receiving unit 108.

Switching unit 123 can switch the transmission path between use for supply of power (power transmission) and use for reception of power (power reception) by power transmitting-and-receiving unit 108. More specifically, switching unit 123 can switch, as a terminal to be used for power transmission or power reception by power transmitting-and-receiving unit 108, between terminal 109d used for power transmission or power reception by power transmitting-and-receiving unit 108 in the first exemplary embodiment and terminal 109a connected to transmission path 122.

Switching unit 123 is implemented by, for example, a bidirectional 2-input/1-output switch circuit. However, the present disclosure does not specifically limit a configuration of switching unit 123.

Transmission path 122 is a 3-pair differential wiring formed from a metal wire for transmission of an RGB signal (electrical signal 114) under the HDMI (registered trademark) standard. For this reason, transmission path 122 has a relatively low electric resistance.

In order to stably transmit a large amount of power with reduced loss between a sink device and a source device which are connected to each other via a cable as shown in FIG. 1, i.e., from one device to the other device, for example, one of the following methods is generally used: reducing an electric resistance by increasing a joint point between a connector and a transmission path; reducing an electric resistance by increasing a diameter of a transmission cable; or reducing an electric resistance by increasing a number of wirings in a transmission path. Because there are limitations on sizes of composite connector 109 and cable 300, the configuration shown in FIG. 1 has a limitation in implementing these methods. Transmission path 122 as a 3-pair differential wiring is a transmission path with a relatively low electric resistance. Accordingly, using transmission path 122 as a transmission path used for power transmission or power reception by power transmitting-and-receiving unit 108 makes it possible to transmit a relatively large amount of power.

As described above, this exemplary embodiment has exemplified the operation in which the connection partner of transmission apparatus 100A is reception apparatus 200A shown in FIG. 9, and transmission apparatus 100A does not use encoder 103 to perform power transmission or power reception to and from reception apparatus 200A via terminal 109a. However, this present disclosure is not limited to this operation. For example, transmission apparatus 100A may operate as described in the third exemplary embodiment. That is, in transmission apparatus 100A, controller 107A may control each constituent element to make encoder 103 output electrical signal 114 and to output electrical signal 114 from terminal 109a, as described in the third exemplary embodiment. In this case, transmission apparatus 100A uses routes of signals indicated by chain line arrows in FIG. 8. Accordingly, such an operation allows transmission apparatus 100A to be connected to reception apparatus 200 described in the first exemplary embodiment via cable 300.

Note that, for example, controller 107A outputs a signal for controlling switching unit 123. For example, upon receiving a signal indicating execution of power transmission or power reception from a connection partner (for example, reception apparatus 200A shown in FIG. 9) of transmission apparatus 100A via terminal 209a, controller 107A may control switching unit 123 to electrically connect terminal 109a to power transmitting-and-receiving unit 108. Alternatively, controller 107A may control switching unit 123 to electrically connect terminal 109a to power transmitting-and-receiving unit 108 so as to transmit a signal indicating execution of power transmission or power reception to a connection partner (for example, reception apparatus 200A) of transmission apparatus 100A via terminal 109a. Alternatively, controller 107A may control switching unit 123 to electrically connect terminal 109d to power transmitting-and-receiving unit 108 in an initial state. Controller 107A may maintain this initial state upon, for example, recognizing that a connection partner of transmission apparatus 100A is reception apparatus 200 described in the first exemplary embodiment or upon receiving a signal indicating execution of power transmission or power reception from a connection partner (for example, reception apparatus 200A) of transmission apparatus 100A via terminal 209d. Alternatively, controller 107A may control switching unit 123 to electrically connect terminal 109a to power transmitting-and-receiving unit 108 upon reaching an agreement concerning execution of power transmission or power reception via terminal 109a with a connection partner (for example, reception apparatus 200A) of transmission apparatus 100A.

[4-2. Configuration of Reception Apparatus]

A configuration of reception apparatus 200A according to the fourth exemplary embodiment will be described next with reference to FIG. 9.

FIG. 9 is a block diagram schematically showing an example of the configuration of reception apparatus 200A according to the fourth exemplary embodiment. Note that the following description will mainly focus on differences between reception apparatus 200A according to the fourth exemplary embodiment and reception apparatus 200 according to the first exemplary embodiment.

Note that the following will describe an operation example in which a connection partner of reception apparatus 200A is transmission apparatus 100A shown in FIG. 8, and reception apparatus 200A performs power transmission to transmission apparatus 100A or power reception from transmission apparatus 100A via terminal 209a. Referring to FIG. 9, chain line arrows indicate routes of signals that are used in the operation example described in the first exemplary embodiment but are not used in the operation example described in the fourth exemplary embodiment.

Note that the same reference numerals as in the first exemplary embodiment denote constituent elements that perform substantially the same operations in the following description, and a description of the constituent elements will be omitted or simplified.

As shown in FIG. 9, reception apparatus 200A according to the fourth exemplary embodiment includes AV processor 203A in place of frequency converter 203 that reception apparatus 200 according to the first exemplary embodiment has. In addition, reception apparatus 200A includes switching unit 223 and audio selector 210 that reception apparatus 200 according to the first exemplary embodiment does not have. Reception apparatus 200A according to the fourth exemplary embodiment mainly differs in these points from reception apparatus 200 according to the first exemplary embodiment.

That is, reception apparatus 200A includes combiner 204, decoder 201, opto-electronic converter 202, AV processor 203A, video output unit 205, audio output unit 206, controller 207A, power transmitting-and-receiving unit 208, composite connector 209, switching unit 223, and audio selector 210.

Controller 207A transmits serial control signal 120 containing receiver information of reception apparatus 200A to a connection partner (for example, transmission apparatus 100A) of reception apparatus 200A via terminal 209c of composite connector 209. In addition, controller 207A outputs power control signal 221 indicating a power transmission instruction or power reception instruction to power transmitting-and-receiving unit 208. Controller 207A may output control signals to decoder 201, opto-electronic converter 202, AV processor 203A, combiner 204, video output unit 205, audio output unit 206, switching unit 223, and audio selector 210. Referring to FIG. 9, broken line arrows indicate control signals output from controller 207A. Controller 207A may receive a control signal from a connection partner (for example, transmission apparatus 100A) of reception apparatus 200A via terminal 209c.

In reception apparatus 200A, power transmitting-and-receiving unit 208 can perform power transmission or power reception to or from power transmitting-and-receiving unit 108 of a connection partner (for example, transmission apparatus 100A) of reception apparatus 200A via terminal 209a. At this time, decoder 201 is not used. In addition, in reception apparatus 200A, decoder 201 can receive electrical signal 114 transmitted, via 109a, from another connection partner (for example, transmission apparatus 100 described in the first exemplary embodiment) of reception apparatus 200A via terminal 209d as in the first exemplary embodiment.

For example, when a connection partner of reception apparatus 200A is transmission apparatus 100A and power transmission or power reception is performed via terminal 109a of transmission apparatus 100A, terminal 209a and power transmitting-and-receiving unit 208 are electrically connected via switching unit 223 in reception apparatus 200A. Alternatively, when a connection partner of reception apparatus 200A is transmission apparatus 100 described in the first exemplary embodiment and electrical signal 114 is transmitted from terminal 109a of transmission apparatus 100, electrical signal 114 is input to switching unit 223 via terminal 209a and is input from switching unit 223 to decoder 201 (a route of the signal at this time is indicted by a chain line arrow).

As described above, in reception apparatus 200A, when power transmission or power reception is to be performed via terminal 209a, switching unit 223 can electrically connect terminal 209a to power transmitting-and-receiving unit 208, whereas when electrical signal 114 is to be received from terminal 209a, switching unit 223 can electrically connect terminal 209a to decoder 201. In this manner, switching unit 223 can switch a connection destination of terminal 209a between power transmitting-and-receiving unit 208 and decoder 201 depending on whether power transmission or power reception is to be performed via terminal 209a or electrical signal 114 is to be received via terminal 209a. Switching unit 223 is implemented by, for example, a bidirectional 2-input/1-output switch circuit. However, the present disclosure does not specifically limit a configuration of switching unit 223.

As described above, in reception apparatus 200A, when a connection partner of reception apparatus 200A is transmission apparatus 100A and transmission apparatus 100A uses transmission path 122 for power transmission or power reception, switching unit 223 electrically connects terminal 209a to power transmitting-and-receiving unit 208. This enables power transmitting-and-receiving unit 208 to perform power transmission to power transmitting-and-receiving unit 108 of transmission apparatus 100A or power reception from power transmitting-and-receiving unit 108 via terminal 209a.

In reception apparatus 200A, optical signal 117 output from terminal 109b of transmission apparatus 100A is input to opto-electronic converter 202 via terminal 209b.

Opto-electronic converter 202 converts optical signal 117 into electrical signal 151A and outputs the signal to AV processor 203A. Electrical signal 151A obtained by this conversion is substantially identical to electrical signal 151 output from AV processor 104A and contains both audio baseband signal 113A and video baseband signal 111A.

AV processor 203A separates electrical signal 151A output from opto-electronic converter 202 into video baseband signal 111A and audio baseband signal 113A. Note that video baseband signal 111A is a signal that is substantially identical to video baseband signal 111 output from video obtainer 101, and audio baseband signal 113A is a signal that is substantially identical to audio baseband signal 113 output from audio obtainer 106. Although the separating processing to be performed by AV processor 203A is not specifically limited, the processing is equivalent to processing performed in a sequence inverse to the sequence in which AV processor 104A of transmission apparatus 100A performs combining processing (inverse conversion processing relative to the combining processing).

AV processor 203A outputs video baseband signal 111A to combiner 204, and audio baseband signal 113A to audio selector 210.

Combiner 204 outputs video baseband signal 111A output from AV processor 203A to video output unit 205 without any change.

Audio selector 210 can switch between outputting audio baseband signal 113A output from AV processor 203A to audio output unit 206 and outputting audio baseband signal 113A output from decoder 201 to audio output unit 206. According to the configuration example described in the fourth exemplary embodiment (that is, when a connection partner of reception apparatus 200A is transmission apparatus 100A shown in FIG. 8), audio selector 210 operates to output audio baseband signal 113A output from AV processor 203A to audio output unit 206. Audio selector 210 is implemented by, for example, a bidirectional 2-input/1-output switch circuit. However, the present disclosure does not specifically limit a configuration of audio selector 210.

Note that, for example, controller 207A outputs signals for controlling switching unit 223 and audio selector 210. Upon receiving, for example, a signal indicating execution of power transmission or power reception from a connection partner (for example, transmission apparatus 100A) of reception apparatus 200A via terminal 109a, controller 207A may control switching unit 223 to electrically connect terminal 209a to power transmitting-and-receiving unit 208, and control audio selector 210 to output audio baseband signal 113A output from AV processor 203A to audio output unit 206. Alternatively, controller 207A may control switching unit 223 to electrically connect terminal 209a to power transmitting-and-receiving unit 208, and control audio selector 210 to output audio baseband signal 113A output from AV processor 203A to audio output unit 206, thereby transmitting a signal indicating execution of power transmission or power reception to a connection partner (for example, transmission apparatus 100A) of reception apparatus 200A via terminal 209a. Alternatively, in an initial state, controller 207A may control switching unit 223 to electrically connect terminal 209a to decoder 201, and control audio selector 210 to output audio baseband signal 113A output from decoder 201 to audio output unit 206. This initial state may be maintained when, for example, a signal indicating transmission of electrical signal 114 from a connection partner of reception apparatus 200A via terminal 109a, when no information concerning terminal 109a is received from a connection partner of reception apparatus 200A, or when it is recognized that a connection partner of reception apparatus 200A is transmission apparatus 100 described in the first exemplary embodiment. Alternatively, controller 207A may control switching unit 223 to electrically connect terminal 209a to power transmitting-and-receiving unit 208, and control audio selector 210 to output audio baseband signal 113A output from AV processor 203A to audio output unit 206 upon reaching an agreement concerning execution of power transmission or power reception via terminal 209a with a connection partner (for example, transmission apparatus 100A) of reception apparatus 200A.

[4-3. Effects and Others of Fourth Exemplary Embodiment]

As described above, according to the fourth exemplary embodiment, the transmission apparatus may include a power transmitting-and-receiving unit configured to perform power transmission to a reception apparatus provided outside the transmission apparatus or power reception from the reception apparatus via a transmission path for the electrical signals. The signal processor may convert the video signal obtained by the video obtainer into the optical signal by using the second converter.

Note that transmission apparatus 100A is an example of the transmission apparatus. Reception apparatus 200A is an example of the reception apparatus. Transmission path 122 is an example of the transmission path. Power transmitting-and-receiving unit 108 is an example of the power transmitting-and-receiving unit. Signal processor 110A is an example of the signal processor. Electro-optic converter 105 is an example of the second converter.

For example, according to the example described in the fourth exemplary embodiment, transmission apparatus 100A includes power transmitting-and-receiving unit 108 that performs power transmission to reception apparatus 200A provided outside transmission apparatus 100A or power reception from reception apparatus 200A via transmission path 122 for electrical signal 114. Signal processor 110A converts video baseband signal 111 obtained by video obtainer 101 into optical signal 117 by using electro-optic converter 105.

Transmission apparatus 100A having the above configuration can implement power transmission or power reception of a large amount of power by using transmission path 122 used for transmission of, for example, the RGB signal (electrical signal 114). Transmission apparatus 100A can perform, for example, power transmission or power reception of a large amount of power concurrently with transmission of video baseband signal 111 and audio baseband signal 113.

[4-4. Modification of Fourth Exemplary Embodiment]

The fourth exemplary embodiment has exemplified the configuration in which power transmission or power reception is performed by using transmission path 122 for electrical signal 114 in transmission apparatus 100A. The present disclosure is not limited to this configuration. Transmission apparatus 100A may transmit not only power but also other arbitrary high-speed communication signals or control signals via transmission path 122.

In the transmission apparatus, the signal processor may convert an obtained video signal into an optical signal by using the second converter and receive an audio return channel (ARC) signal complying with the HDMI (registered trademark) standard from the reception apparatus provided outside the transmission apparatus via a transmission path for electrical signals.

That is, in transmission apparatus 100A, signal processor 110A may convert an obtained video signal into an optical signal by using electro-optic converter 105 and obtain an ARC signal defined in the HDMI (registered trademark) standard from reception apparatus 200A provided outside transmission apparatus 100A via transmission path 122 for transmitting electrical signal 114.

More specifically, the ARC signal is a digital audio signal defined in IEC 60958-1 and is also a digital audio signal transmitted from a sink device to a source device. The ARC signal is a digital audio signal corresponding to Sony (registered trademark)/Philips (registered trademark) digital interface (S/PDIF) having undergone changes in interface specifications such as electric levels.

Note that encoder 103 may have a function as a decoder and convert the ARC signal as a digital audio signal into an analog signal, which may be obtained by signal processor 110A. Alternatively, for example, encoder 103 or its peripheral circuit may be configured to pass the ARC signal as a digital signal without any change, and signal processor 110A may obtain the ARC signal as the digital signal without any change.

Fifth Exemplary Embodiment

[5-1. Configuration]

Transmission-and-reception system 10A according to a fifth exemplary embodiment will be described with reference to FIG. 10.

Although a configuration to be described in the fifth exemplary embodiment can be applied to any of transmission apparatuses 100 and 100A and reception apparatuses 200 and 200A described in the first to fourth exemplary embodiments, the fifth exemplary embodiment will exemplify transmission-and-reception system 10A including transmission apparatus 100A and reception apparatus 200A described in the fourth exemplary embodiment.

Figure 10:
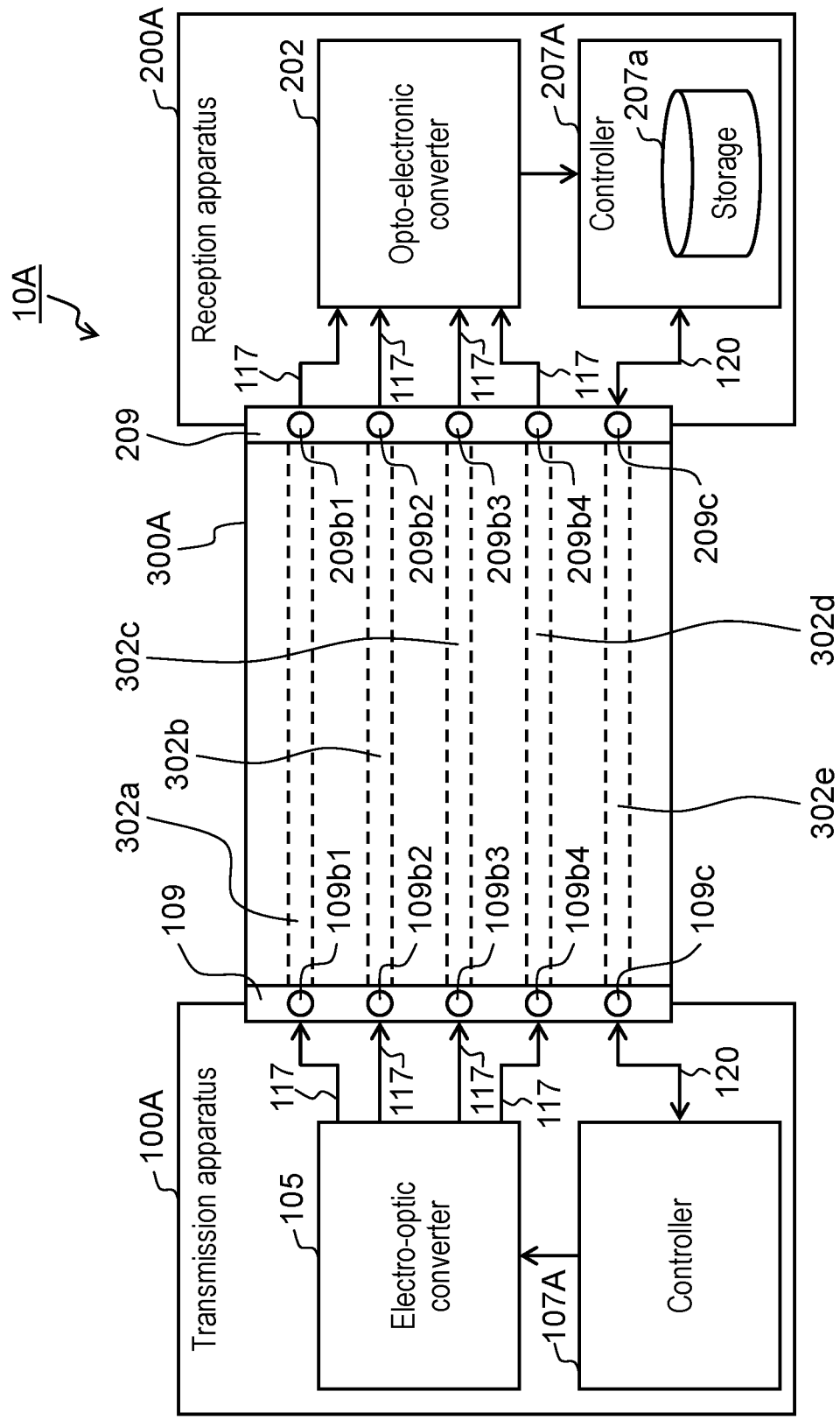
FIG. 10 is a view schematically showing an example of a configuration of a transmission-and-reception system according to a fifth exemplary embodiment.

FIG. 10 is a block diagram schematically showing an example of the configuration of transmission-and-reception system 10A according to the fifth exemplary embodiment.

As shown in FIG. 10, transmission-and-reception system 10A includes transmission apparatus 100A, reception apparatus 200A, and cable 300A, and is configured such that transmission apparatus 100A and reception apparatus 200A are connected to each other via cable 300A.

Note that transmission apparatus 100A shown in FIG. 10 is substantially identical to transmission apparatus 100A shown in FIG. 8, and reception apparatus 200A shown in FIG. 10 is substantially identical to reception apparatus 200A shown in FIG. 9. However, FIG. 10 shows only constituent elements highly associated with the following description, and omits other constituent elements. In addition, cable 300A shown in FIG. 10 is substantially identical to cable 300 described in the first exemplary embodiment, but includes four optical cables 302a to 302d.

In some cases, an optical signal is transmitted concurrently via a plurality of optical cables (optical fibers). In such a case, an optical signal is separately transmitted via a plurality of channels in accordance with a maximum transmission speed per optical cable (an amount of information that can be transmitted via one optical cable per unit time (for example, one sec)) and an amount of information transmitted per unit time via an optical signal. For example, in transmission-and-reception system 10A shown in FIG. 10, optical signal 117 is transmitted via four optical cables 302a to 302d included in cable 300A. Note that a number of optical cables for transmitting optical signal 117 shown in FIG. 10 is merely an example, and the present disclosure does not specifically limit the number of optical cables for transmitting optical signal 117.

Transmission apparatus 100A includes four terminals 109b1 to 109b4 corresponding to four optical cables 302a to 302d. Terminals 109b1 to 109b4 are a plurality of terminals for divisionally transmitting optical signal 117 via a plurality of transmission paths (for example, optical cables 302a to 302d), and are included in composite connector 109.

Like transmission apparatus 100A, reception apparatus 200A includes four terminals 209b1 to 209b4 corresponding to four optical cables 302a to 302d. Terminals 209b1 to 209b4 are a plurality of terminals for receiving divided optical signals 117 via a plurality of transmission paths (for example, optical cables 302a to 302d) and are included in composite connector 209.

According to the configuration example shown in FIG. 10, terminals 109b1 and 209b1 are optically connected to each other via optical cable 302a, terminals 109b2 and 209b2 are optically connected to each other via optical cable 302b, terminals 109b3 and 209b3 are optically connected to each other via optical cable 302c, and terminals 109b4 and 209b4 are optically connected to each other via optical cable 302d.

An optical cable fails to transmit any optical signal when the optical cable breaks due to, for example, breakage of an optical fiber conductor in the cable. In addition, in some cases, a fitting portion between an optical cable and a connector is subject to displacement or contamination to result in a failure to transmit any optical signals.

In order to prepare for such cases, in transmission-and-reception system 10A described in the fifth exemplary embodiment, transmission apparatus 100A is configured to make controller 107A obtain transmission quality information indicating transmission quality in a plurality of transmission paths (for example, optical cables 302a to 302d). Transmission quality information is, for example, identification information (for example, a number assigned to each optical cable or each terminal) for specifying an optical cable or terminal where transmission quality of optical signal 117 has deteriorated (optical signal 117 cannot be transmitted). Note that the transmission quality information is not limited to the identification information. For example, a bit error rate or the like may be used.

Note that the identification information of each optical cable and the identification information of each terminal may be shared in advance between transmission apparatus 100A and reception apparatus 200A. Alternatively, each divided optical signal 117 may contain the identification information of a terminal (optical cable) used for transmission of each optical signal 117.

The following description concerns an operation when a given terminal (optical cable) becomes unusable in transmission-and-reception system 10A.

In transmission-and-reception system 10A, reception apparatus 200A transmits the transmission quality information to transmission apparatus 100A. Upon receiving optical signals 117 via terminals 209b1 to 209b4, opto-electronic converter 202 of reception apparatus 200A detects, for each terminal, based on an error detection technique (for example, cyclic redundancy check (CRC), which is generally used), whether any error has occurred in each optical signal 117. If there is any terminal (optical cable) determined to have undergone a deterioration in transmission quality accompanying an increase in error occurrence rate beyond a predetermined value, opto-electronic converter 202 notifies controller 207A of the identification information of the corresponding terminal (optical cable). Upon reception of this notification, controller 207A transmits transmission quality information indicating the identification information of the notified terminal (optical cable) as serial control signal 120 to controller 107A of transmission apparatus 100A. At this time, controller 107A receives serial control signal 120 output from controller 207A via terminal 209c of composite connector 209, which reception apparatus 200A has, electric wire 302e of cable 300A, and terminal 209c of composite connector 109, which transmission apparatus 100A has. Controller 107A then outputs the received transmission quality information to electro-optic converter 105.

Electro-optic converter 105 specifies a transmission path having undergone a deterioration in transmission quality on the basis of the transmission quality information obtained from controller 107A, selects one or more terminals from terminals 109b1 to 109b4 which correspond to transmission paths of a plurality of transmission paths for transmission of optical signals 117 from transmission apparatus 100A to reception apparatus 200A except for transmission paths having undergone a deterioration in transmission quality, and divisionally outputs optical signals 117 to the selected terminals.

This enables electro-optic converter 105 to specify a transmission path having undergone a deterioration in transmission quality (which has become incapable of transmitting optical signal 117) on the basis of the transmission quality information, and hence to avoid an optical cable or terminal corresponding to this transmission path and transmit optical signals 117 to reception apparatus 200A by using only transmission paths with high transmission quality. It is therefore possible for transmission-and-reception system 10A to reduce the occurrence of failures to transmit video baseband signal 111 and audio baseband signal 113 from transmission apparatus 100A to reception apparatus 200A when there occurs an optical cable or terminal that has undergone a deterioration in transmission quality (which has become incapable of transmitting optical signal 117).

A specific operation example of transmission-and-reception system 10A described above will be described.

Assume that a maximum transmission rate of each of optical cables 302a to 302d is 27 Giga bits per second (Gbps). In this case, when all four optical cables 302a to 302d are used to transmit optical signals 117, a maximum transmission rate of optical signals 117 from transmission apparatus 100A to reception apparatus 200A becomes 27 Gbps×4=108 Gbps.

A transmission rate of video baseband signal 111 with the 8K resolution (8K 60p) is (8800 pixels in the horizontal direction)×(4500 lines in the vertical direction)×(refresh rate 60 Hz)×(RGB 3 ch)=71.28 Gbps. In transmission-and-reception system 10A, therefore, when transmission apparatus 100A transmits 8K-resolution video baseband signal 111 to reception apparatus 200A, it suffices to ensure a transmission rate of about 72 Gbps.

In the above configuration, when three optical cables among cables 302a to 302d are concurrently (simultaneously) used, a maximum transmission rate of optical signals 117 from transmission apparatus 100A to reception apparatus 200A is 27 Gbps×3=81 Gbps. Using three of four optical cables 302a to 302d enables transmission-and-reception system 10A having the above configuration to transmit 8K-resolution video baseband signals 111 from transmission apparatus 100A to reception apparatus 200A via optical signals 117.

Even if, therefore, one (for example, optical cable 302b) of optical cables 302a to 302d cannot be used because of damage or the like, electro-optic converter 105 can transmit 8K-resolution video baseband signals 111 via optical signals 117 by selecting three terminals (for example, terminals 109b1, 109b3, and 109b4) corresponding to optical cables (for example, 302a, 302c, and 302d), of optical cables 302a to 302d, from which the unusable cable is excluded, and divisionally outputting optical signals 117 to the selected three terminals.

Note that electro-optic converter 105 may output, in an initial state, for example, optical signal 117 containing identification information "1" to terminal 109b1, optical signal 117 containing identification information "2" to terminal 109b2, optical signal 117 containing identification information "3" to terminal 109b3, and optical signal 117 containing identification information "4" to terminal 109b4. After one optical cable (for example, optical cable 302b) becomes unusable, electro-optic converter 105 may output optical signal 117 containing identification information "1" to terminal 109b1, optical signal 117 containing identification information "2" to terminal 109b3, and optical signal 117 containing identification information "3" to terminal 109b4, for example. In this manner, after a given optical cable becomes unusable, electro-optic converter 105 may change the identification information assigned to each terminal from information in the initial state.

Note that if two optical cables become unusable, electro-optic converter 105 may select two terminals corresponding to two remaining usable optical cables. In addition, if three optical cables become unusable, electro-optic converter 105 may select a terminal corresponding to one remaining usable cable. Electro-optic converter 105 may transmit video baseband signal 111 with a resolution (information amount) corresponding to a number of usable optical cables via optical signal 117.

Note that in reception apparatus 200A, storage 207a may store division information indicating a specific division scheme used for optical signal 117, which allows reception apparatus 200A to receive signals (perform signal processing). For example, the division information may contain information such as a maximum division number of optical signal 117 and a maximum transmission rate (resolution) per terminal (channel). The division information may be part of the receiver information. In this case, in transmission apparatus 100A, for example, electro-optic converter 105 can divide and output an optical signal by a division scheme that allows reception apparatus 200A to receive signals (perform signal processing) by causing controller 107A to obtain the division information as serial control signal 120.

[5-2. Effects and Others of Fifth Exemplary Embodiment]

As described above, in the fifth exemplary embodiment, the transmission apparatus may include a plurality of terminals configured to divisionally transmit the optical signals via a plurality of transmission paths.

In the fifth exemplary embodiment, the reception apparatus may include a plurality of terminals configured to obtain divided optical signals via a plurality of transmission paths.

Note that transmission apparatus 100A is an example of the transmission apparatus. Optical cables 302a to 302d are an example of the plurality of transmission paths. Terminals 109b1 to 109b4 are an example of the plurality of terminals that the transmission apparatus includes. Reception apparatus 200A is an example of the reception apparatus. Terminals 209b1 to 209b4 are example of the plurality of terminals that the reception apparatus includes.

For example, in the example described in the fifth exemplary embodiment, transmission apparatus 100A includes the plurality of terminals 109b1 to 109b4 for divisionally transmitting optical signals 117 via optical cables 302a to 302d.

Reception apparatus 200A includes the plurality of terminals 209b1 to 209b4 for receiving divided optical signals 117 via optical cables 302a to 302d.

This enables transmission apparatus 100A to divide optical signal 117 and transmit divided optical signals 117 via the plurality of transmission paths (optical cables 302a to 302d). Reception apparatus 200A can receive divided optical signals 117 via the plurality of transmission paths (optical cables 302a to 302d).

The transmission apparatus may include a transmission quality obtainer configured to obtain transmission quality information indicating transmission quality in the plurality of transmission paths. The second converter may select one or more terminals corresponding to some of the plurality of transmission paths from the plurality of terminals on the basis of the obtained transmission quality information, divide an optical signal in accordance with a number of selected terminals, and output the divided optical signals from the selected one or more terminals.

Note that controller 107A is an example of the transmission quality obtainer.

For example, in the example described in the fifth exemplary embodiment, transmission apparatus 100A includes controller 107A that obtains transmission quality information indicating transmission quality in the plurality of transmission paths (optical cables 302a to 302d). Electro-optic converter 105 selects one or more terminals corresponding to some of the plurality of transmission paths (optical cables 302a to 302d) from the plurality of terminals 109b1 to 109b4 on the basis of the obtained transmission quality information, divides optical signal 117 in accordance with a number of selected terminals, and outputs divided optical signals 117 from one or more selected terminals.

This allows transmission apparatus 100A to select transmission paths with good transmission quality and transmit optical signals 117 by using the selected transmission paths.

[5-3. Modification of Fifth Exemplary Embodiment]

In general, an optical cable can bidirectionally transmit optical signals. Accordingly, transmission apparatus 100A can also receive an optical signal from reception apparatus 200A via cable 300A (optical cables 302a to 302d). In this case, in transmission apparatus 100A, electro-optic converter 105 may be replaced with an optical signal processor that has a function of electro-optic converter 105 described above and can also receive optical signals. In reception apparatus 200A, opto-electronic converter 202 may be replaced with an optical signal processor that has a function of opto-electronic converter 202 described above and can transmit optical signals. This enables the optical signal processor of reception apparatus 200A to transmit optical signals to the optical signal processor of transmission apparatus 100A.

For example, serial control signal 120 may be transmitted as an optical signal via any of optical cables 302a to 302d. That is, in the transmission apparatus, the receiver information obtainer may obtain the receiver information as an optical signal via a transmission path for optical signals when the controller cannot obtain the receiver information as an electrical signal. More specifically, for example, in transmission apparatus 100A, controller 107A may obtain the receiver information as an optical signal via any of optical cables 302a to 302d, which are transmission paths for optical signals 117, when controller 107A cannot obtain the receiver information as an electrical signal via electric wire 302e.

This enables transmission apparatus 100A to obtain the receiver information as an optical signal via any of optical fibers 302a to 302d when the apparatus cannot obtain the receiver information as an electrical signal from reception apparatus 200A because of, for example, breakage of electric wire 302e. Note that transmission apparatus 100A may determine that the receiver information cannot be obtained as an electrical signal, when, for example, controller 107A cannot obtain any response from reception apparatus 200A despite transmitting serial control signal 120 for requesting for the receiver information as an electrical signal to reception apparatus 200A via electric wire 302e.

Other Exemplary Embodiments

The first to fifth exemplary embodiments each have been described above as an example of the technique disclosed in the present disclosure. However, the technique in the present disclosure is not limited to this and can also be applied to exemplary embodiments having undergone changes, replacements, additions, omissions, and the like. In addition, new exemplary embodiments can be implemented by combining the respective constituent elements described above in the first to fifth exemplary embodiments.

Hence other exemplary embodiments will be described below.

For example, the HDMI (registered trademark) standard described in the above exemplary embodiments may include a version to be used in the future as well as the existing version. That is, the present disclosure may be applied to a new version of the HDMI (registered trademark) standard which will be used in the future.

Operation example 2 of the second exemplary embodiment has exemplified the operation of deciding a resolution of low-band video signal 112 at the time of video separating processing in step S24 by using both the receiver information obtained in step S22 and cable information 320 obtained in step S23. However, the present disclosure is not limited to this operation. The resolution of low-band video signal 112 may be decided by using at least one of the receiver information obtained in step S22 and cable information 320 obtained in step S23.

For example, transmission apparatus 100A described in the fourth exemplary embodiment may be configured to execute each of operations described in the first to fourth exemplary embodiments by making signal processor 110A include frequency converter 104 described in the first exemplary embodiment.

Alternatively, reception apparatus 200A according to the fourth exemplary embodiment may include frequency converter 203 described in the first exemplary embodiment, and may be configured to execute each of operations described in the first to fourth exemplary embodiments.

In transmission apparatus 100A described in the modification of the fourth exemplary embodiment, controller 107A may obtain the ARC signal. Controller 107A may obtain the ARC signal via transmission path 122.

Each constituent element in each exemplary embodiment described above may be implemented by dedicated hardware or executing a software program suitable for each constituent element. Each constituent element may be implemented by causing a program execution unit such as a central processing unit (CPU) or processor to read out and execute a software program recorded on a recording medium such as a hard disk or a semiconductor memory.

Each constituent element may be a circuit (or integrated circuit). These circuits may constitute one circuit as a whole or may be independent from each other. In addition, these circuits may be general-purpose circuits or dedicated circuits.

General or specific aspects of the present disclosure may be implemented by a system, an apparatus, a method, an integrated circuit, a computer program, or a recording medium such as a computer-readable CD-ROM. Such aspects may also be implemented by arbitrary combinations of a system, an apparatus, a method, an integrated circuit, a computer program, and a recording medium. For example, the present disclosure may be implemented as a transmission-and-reception system according to each exemplary embodiment described above or as a transmission method implemented by a transmission apparatus or a reception method implemented by a reception apparatus.

The sequence of a plurality of processes in the operations of the transmission apparatus and the reception apparatus described in the above embodiments is an example. The sequence of the plurality of processes may be changed or the plurality of processes may be concurrently executed. In addition, processing executed by a specific processor may be executed by another processor.

As described above, the exemplary embodiments have been described as an example of a technique according to the present disclosure. The attached drawings and detailed descriptions have been provided for this purpose.

Accordingly, the constituent elements described in the attached drawings and detailed descriptions may include not only constituent elements that are essential to solve the problem but also constituent elements that are provided as examples used to exemplify the technique and are not essential to solve the problem. For this reason, the fact that the constituent elements that are not essential are described in the attached drawings and detailed descriptions should not directly be interpreted to indicate that the inessential constituent elements are essential.

The above exemplary embodiments are provided to exemplify the technique according to the present disclosure. Therefore, it is possible to make various changes, replacements, additions, omissions, and the like within the scope of the claims and equivalents thereof.

INDUSTRIAL APPLICABILITY

The present disclosure can be used for, for example, transmission of high-resolution video baseband signals. More specifically, the present disclosure can be applied to video signal transmission apparatuses, video signal reception apparatuses, and the like.

REFERENCE MARKS IN THE DRAWINGS 10, 10A: transmission-and-reception system
100, 100A: transmission apparatus
101: video obtainer
102: separator
103: encoder
104, 203: frequency converter
104A, 203A: AV processor
105: electro-optic converter
106: audio obtainer
107, 107A, 207, 207A: controller
108: power transmitting-and-receiving unit
109: composite connector
109*a*, 109*b*, 109*b*1, 109*b*2, 109*b*3, 109*b*4, 109*c*, 109*d*, 109*e*, 209*a*, 209*b*, 209*b*1, 209*b*2, 209*b*3, 209*b*4, 209*c*, 209*d*: terminal
110, 110A: signal processor
111, 111A: video baseband signal
112, 112A: low-band video signal
113, 113A: audio baseband signal
114, 151, 151A: electrical signal
115, 115A: first high-band video signal
116, 116A: second high-band video signal
117: optical signal
118: audio control signal
119: video control signal
120: serial control signal
121: power control signal
122: transmission path
123, 223: switching unit
200, 200A: reception apparatus
201: decoder
202: opto-electronic converter
204: combiner
205: video output unit
206: audio output unit
207*a*: storage
208: power transmitting-and-receiving unit
209: composite connector
210: audio selector
221: power control signal
300, 300A: cable
301: storage
302*a*, 302*b*, 302*c*, 302*d*: optical cable
302*e*: electric wire
320: cable information

The invention claimed is:

1. A transmission apparatus comprising:
a video obtainer configured to obtain a video signal;
a first converter configured to convert the video signal into an electrical signal complying with a high definition multimedia interface (HDMI (registered trademark)) standard;
a second converter configured to convert the video signal into an optical signal; and
a signal processor configured to receive the video signal from the video obtainer and to perform the conversion of the obtained video signal using the first converter and the conversion of the obtained video signal using the second converter,
wherein the signal processor is further configured to perform video separating processing of the obtained video signal by:
separating the obtained video signal into a first video signal forming a first frequency component of an image contained in the video signal and a second video signal forming a second frequency component that is contained in a frequency component of the image, the second frequency component belonging to a band higher than a band to which the first frequency component belongs,
converting the first video signal into the electrical signal using the first converter, and
converting the second video signal into the optical signal using the second converter.

2. The transmission apparatus according to claim 1, wherein
the signal processor performs sub-sampling processing to lower a sampling frequency of the second video signal below a sampling frequency of the video signal, and
the signal processor converts the second video signal having undergone the sub-sampling processing into the optical signal by using the second converter.

3. The transmission apparatus according to claim 1, wherein the signal processor separates, in the video separating processing, the obtained video signal into the first video signal forming an image with a predetermined resolution and the second video signal obtained by removing a signal component of the first video signal from the obtained video signal.

4. The transmission apparatus according to claim 3, wherein a transmission rate at which a video signal forming the image having the predetermined resolution is transmitted as the electrical signal by using the first converter is not more than a predetermined transmission rate lower than a maximum transmission rate of an electrical signal defined in the HDMI (registered trademark) standard.

5. The transmission apparatus according to claim 1, further comprising:
   a connector to which a cable configured to connect a reception apparatus provided outside the transmission apparatus to the transmission apparatus is connected, the connector including a terminal configured to output the electrical signal to the reception apparatus and a terminal configured to output the optical signal to the reception apparatus;
   a cable information obtainer configured to obtain cable information, from a storage included in the cable, indicating a maximum transmission rate of the electrical signal via the cable when the cable is connected to the connector; and
   a receiver information obtainer configured to obtain receiver information indicating a maximum transmission rate of the electrical signal at the reception apparatus, the maximum transmission rate indicating a maximum value of a transmission rate of the electrical signal that the reception apparatus provided outside the transmission apparatus can receive,
   wherein the signal processor performs the video separating processing based on the obtained receiver information and the obtained cable information.

6. The transmission apparatus according to claim 5, wherein the receiver information obtainer obtains the receiver information as the optical signal via a transmission path for the optical signal when the receiver information cannot be obtained as the electrical signal.

7. The transmission apparatus according to claim 1, further comprising an audio obtainer configured to obtain an audio signal, wherein
   the first converter further converts the audio signal into the electrical signal, and
   the signal processor converts the obtained audio signal into the electrical signal by using the first converter, and converts the obtained video signal into the optical signal by using the second converter.

8. The transmission apparatus according to claim 1, further comprising a power transmitting-and-receiving unit configured to perform power transmission to a reception apparatus provided outside the transmission apparatus or power reception from the reception apparatus via a transmission path for the electrical signal,
   wherein the signal processor converts the video signal obtained by the video obtainer into the optical signal by using the second converter.

9. The transmission apparatus according to claim 1, wherein
   the signal processor converts the obtained video signal into the optical signal by using the second converter, and
   the signal processor obtains an audio return channel (ARC) signal defined in the HDMI (registered trademark) standard from a reception apparatus provided outside the transmission apparatus via a transmission path for the electrical signal.

10. The transmission apparatus according to claim 1, further comprising a plurality of terminals configured to divisionally transmit the optical signal via a plurality of transmission paths.

11. The transmission apparatus according to claim 10, further comprising a transmission quality obtainer configured to obtain transmission quality information indicating transmission quality in the plurality of transmission paths,
   wherein the second converter selects not less than one terminal corresponding to some of the plurality of transmission paths from the plurality of terminals, based on the obtained transmission quality information, and divisionally outputs the optical signal to the selected not less than one terminal.

12. A reception apparatus that outputs a signal obtained by reconstructing a video signal, the reception apparatus comprising:
   a first reconstructor configured to obtain an electrical signal complying with a high definition multimedia interface (HDMI (registered trademark)) standard and containing a first video signal as part of the video signal and reconstruct the first video signal by using the obtained electrical signal;
   a second reconstructor configured to obtain an optical signal containing a second video signal as part of the video signal and reconstruct the second video signal by using the obtained optical signal; and
   a combiner configured to generate a combined video signal by combining the reconstructed first video signal and the reconstructed second video signal and output the generated combined video signal as a reconstructed signal.

13. The reception apparatus according to claim 12, wherein
   the first video signal forms a first frequency component of an image contained in the video signal, and
   the second video signal forms a second frequency component that is contained in a frequency component of the image and belongs to a band higher than a band to which the first frequency component belongs.

14. The reception apparatus according to claim 13, wherein the second video signal is a signal whose sampling frequency is lowered below a sampling frequency of the video signal by sub-sampling processing.

15. The reception apparatus according to claim 12, further comprising:
   a storage storing receiver information indicating a maximum transmission rate of the electrical signal at the reception apparatus and resolution information indicating a maximum resolution that allows signal processing when the reception apparatus performs the signal processing upon obtaining both the electrical signal and the optical signal, the maximum transmission rate indicating a maximum value of a transmission rate of the electrical signal that the reception apparatus can receive; and
   a terminal configured to output the receiver information and the resolution information to a transmission apparatus provided outside the reception apparatus.

16. The reception apparatus according to claim 12, further comprising a plurality of terminals configured to obtain divided optical signals via a plurality of transmission paths.

17. The transmission apparatus according to claim 5, wherein the cable includes a storage device that stores cable information that indicates a maximum transmission rate of an electrical signal via the cable.

18. A transmission method, comprising:
   obtaining a video signal;
   separating the video signal into a first video signal forming a first frequency component of an image contained in the video signal and a second video signal forming a second frequency component that is contained in a frequency component of the image, the second frequency component belonging to a band higher than a band to which the first frequency component belongs;

converting, using a first converter, the first video signal into an electrical signal complying with a high definition multimedia interface (HDMI (registered trademark)) standard; and converting, using a second converter, the second video signal into an optical signal.

19. A reception method executed by a reception apparatus configured to output a signal obtained by reconstructing a video signal, the method comprising:

obtaining an electrical signal complying with a high definition multimedia interface (HDMI (registered trademark)) standard and containing a first video signal as part of the video signal, and reconstructing the first video signal by using the obtained electrical signal;

obtaining an optical signal containing a second video signal as part of the video signal, and reconstructing the second video signal by using the obtained optical signal; and generating a combined video signal by combining the reconstructed first video signal and the reconstructed second video signal, and outputting the generated combined video signal as a reconstructed signal.

20. The reception apparatus of claim 12, wherein the reception apparatus is used with the transmission apparatus of claim 1.

21. The reception apparatus of claim 12, wherein the reception apparatus receives the electrical signal and the optical signal output from the transmission apparatus of claim 1.

22. The reception method of claim 19, wherein the reception apparatus is used with the transmission apparatus of claim 1.

23. The reception method of claim 19, wherein the reception apparatus obtains the electrical signal and the optical signal that are output from the transmission apparatus of claim 1.

* * * * *